United States Patent [19]

Sakai et al.

[11] Patent Number: 5,812,697
[45] Date of Patent: Sep. 22, 1998

[54] METHOD AND APPARATUS FOR RECOGNIZING HAND-WRITTEN CHARACTERS USING A WEIGHTING DICTIONARY

[75] Inventors: Yoshifumi Sakai; Yoshitaka Ikeda, both of Tokyo, Japan

[73] Assignee: Nippon Steel Corporation, Tokyo, Japan

[21] Appl. No.: 800,374

[22] Filed: Feb. 14, 1997

Related U.S. Application Data

[63] Continuation of Ser. No. 468,309, Jun. 6, 1995, abandoned.

[30] Foreign Application Priority Data

Jun. 10, 1994 [JP] Japan .................................. 6-128614
Sep. 29, 1994 [JP] Japan .................................. 6-234652
Apr. 10, 1995 [JP] Japan .................................. 7-083664
Apr. 12, 1995 [JP] Japan .................................. 7-086823

[51] Int. Cl.$^6$ .......................................................... G06K 9/18
[52] U.S. Cl. ......................................................... 382/186
[58] Field of Search ................................... 382/186, 187, 382/220, 179, 189, 225

[56] References Cited

U.S. PATENT DOCUMENTS 4,731,857  3/1988  Tappert ..................................... 382/178
5,077,807  12/1991 Bokser ..................................... 382/225
5,113,452  5/1992  Chatani et al. ........................... 382/187

(List continued on next page.)

FOREIGN PATENT DOCUMENTS 1-121988  5/1989  Japan .

OTHER PUBLICATIONS

K. Odaka et al., Stroke Order Free On-line Handwritten Character Recognition Algorithm, Institute of Electronics, Information and Communications Engineers of Japan Papers, Jun. 1982, vol. J 65–D, No. 6, pp. 679–686.

S. Miyahara et al., Character Segmentation for Documents Including Various Sized Characters and Spacing Based on Partial Pattern Recognition, Institute of electronics, Information and Communication Engineers of Japan Papers Jun. 1989, vol. J 72 D–11, pp. 846–854.

(List continued on next page.)

Primary Examiner—Joseph Mancuso
Assistant Examiner—Jayanti K. Patel
Attorney, Agent, or Firm—Law Offices Pollock, Vande Sande & Priddy

[57] ABSTRACT

A method of recognizing handwritten characters. A recognition dictionary is prepared including a plurality of characters and corresponding character clusters. A weighting dictionary is prepared including weighting clusters and corresponding object characters. All segmentation position candidates are selected by segmenting handwritten character ink data. Each of the position candidates is separated in a direction corresponding to a direction in which the handwritten character ink data is inputted from a leading position of the ink data and satisfying a predetermined condition. A character candidate is selected corresponding to each segment of the ink data segmented at the segmentation position candidates by referring to the recognition dictionary and calculating a distance value between each of the segments of the ink data and a selected one of the character clusters. The weighting dictionary is referred to and the distance value calculated for one of the character candidates is weighted if one of the weighting clusters included in the weighting dictionary is similar to any one of the segments of the ink data segmented at the segmentation position candidates and if the object character of the one weighting cluster coincides with the one of the character candidates. A rank of the character candidates is determined in accordance with the weighted distance values thereof.

10 Claims, 23 Drawing Sheets

U.S. PATENT DOCUMENTS

| | | | |
|---|---|---|---|
| 5,150,424 | 9/1992 | Aguro et al. | 382/189 |
| 5,187,551 | 2/1993 | Tanaka | 257/347 |
| 5,214,717 | 5/1993 | Kimura et al. | 382/202 |
| 5,265,174 | 11/1993 | Nakatsuka | 382/189 |
| 5,272,470 | 12/1993 | Zetts | 382/189 |
| 5,341,438 | 8/1994 | Clifford | 382/179 |
| 5,392,363 | 2/1995 | Fujisaki et al. | 382/187 |
| 5,481,625 | 1/1996 | Suzuki | 382/179 |

OTHER PUBLICATIONS

R. Powalka et al., The Use of Word Shape Information for Cursive Script Recognition, IWFHR–IV, The Forth International Workshop on Frontiers in Handwriting Recognition, Dec. 7–9, 1994, pp. 67–76.

V. Pflug, Using Radial Basis Function Networks for the Extraction of Geometrical Features from On–line Cursive Script, IWFHR–IV, The Forth International Workshop on Frontiers in Handwriting Recognition, Dec. 7–9, 1994, pp. 77–86.

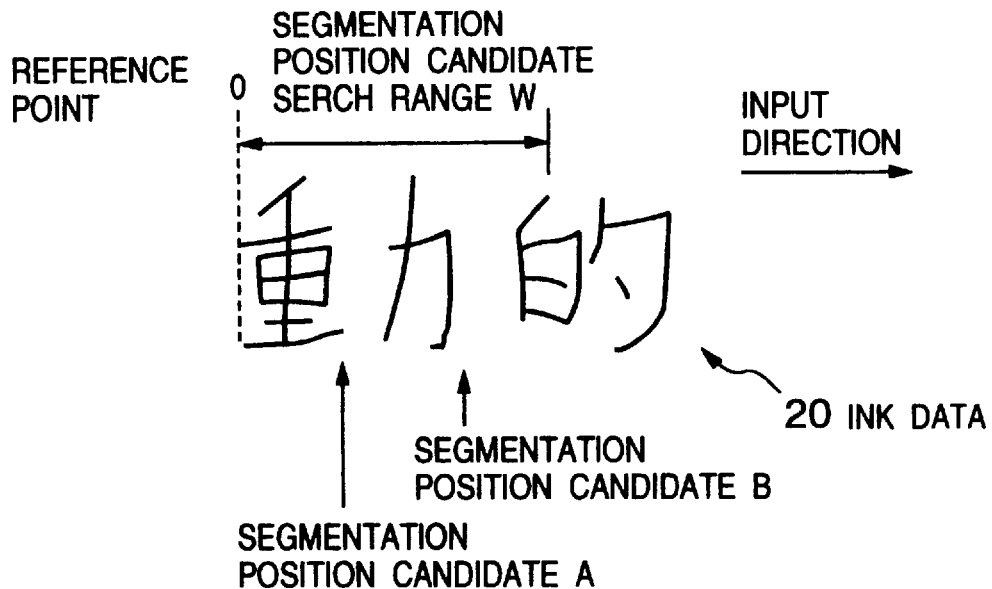

FIG.4A
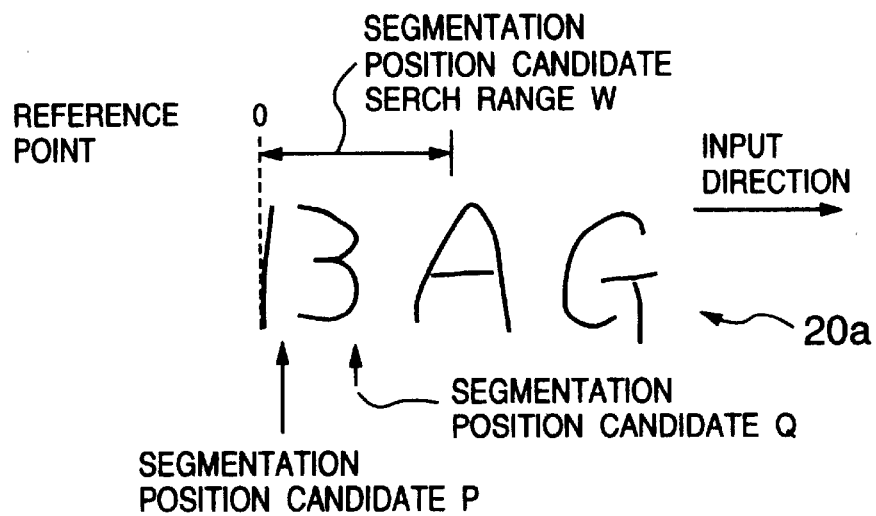
REFERENCE POINT
SEGMENTATION POSITION CANDIDATE SERCH RANGE W
INPUT DIRECTION
SEGMENTATION POSITION CANDIDATE Q
SEGMENTATION POSITION CANDIDATE P
FIG.4B
| CONTENTS OF WEIGHTING CLUSTER | OBJECT CHARACTER FOR WEIGHTING |
|---|---|
| 13 | 1 |
| 13 | B |
| ⋮ | ⋮ |
FIG.5A
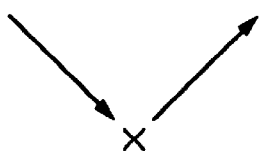
FIG.5B
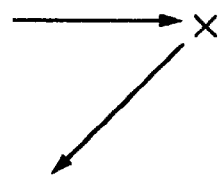

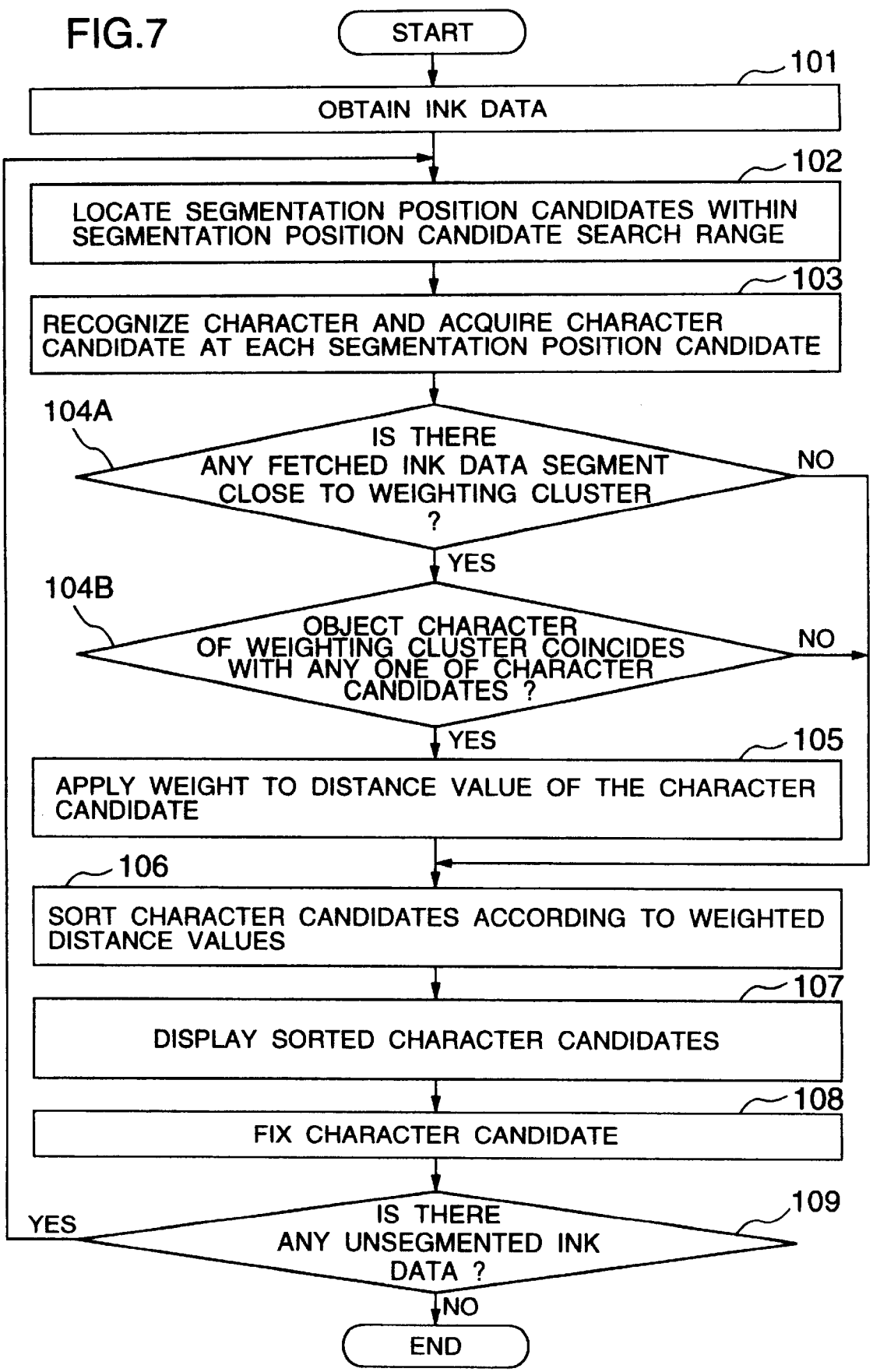

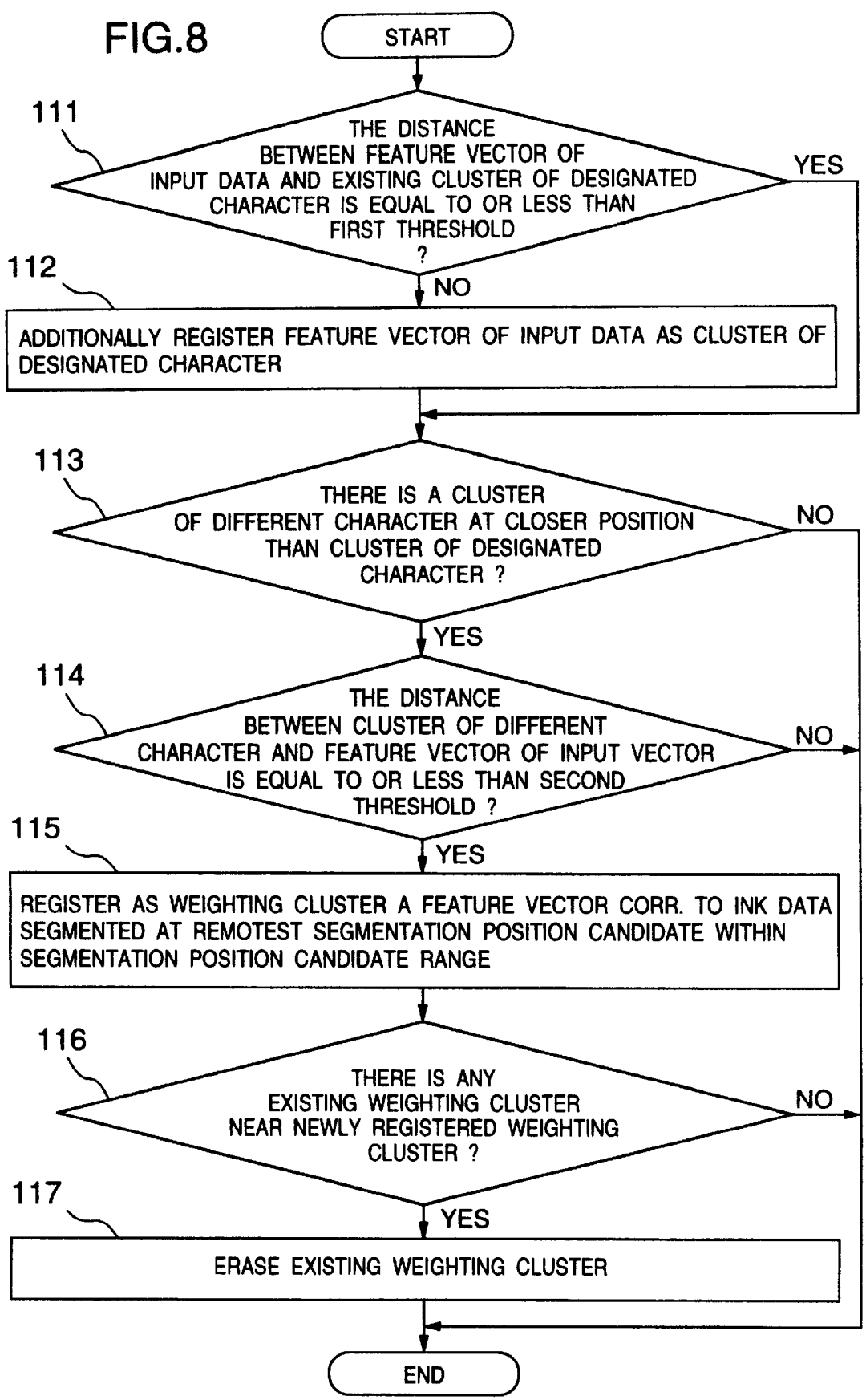

METHOD AND APPARATUS FOR RECOGNIZING HAND-WRITTEN CHARACTERS USING A WEIGHTING DICTIONARY

This application is a Continuation of U.S. patent application Ser. No. 08/468,309, filed Jun. 6, 1995, now abandoned.

BACKGROUND OF THE INVENTION

1. Field of the Invention

The present invention relates to a method and an apparatus for recognizing handwritten characters, and more particularly to a method and an apparatus for recognizing, on an on-line basis generally, but not limited thereto, respective characters from data on a plurality of handwritten characters inputted with no input frame.

2. Description of the Related Art

The following documents disclose the prior arts related to the present invention:

Document 1: K. Okada et al, "Algorithm for On-line Recognition of Handwritten Characters without Depending on Their Order of Strokes", Institute of Electronics, Information and Communication Engineers of Japan Papers '82/6, Vol. J 65-D, No. 6, pp. 679–686;

Document 2: S. Miyahara et al, "Segmentation and Recognition of Characters from a Variable Pitch Document Based on Partial Patterns", Institute of Electronics, Information and Communication Engineers of Japan Papers '89/6, Vol, J 72-D-11, No. 6, pp. 846–854;

Document 3: JP-A-1-121988;

Document 4: Robert K. Powalka et al, "The Use of Word Shape Information for Cursive Script cognition", IWFHR-IV, The Forth International workshop on Frontiers in Handwriting Recognition, Dec. 7–9, 1994. pp. 67–76;

Document 5: V. Pflug, "Using Radial Basis Function Networks for the Extraction of Geometrical Features from On-line Cursive Script", IWFHR-IV, The Forth International Workshop on Frontiers in Handwriting Recognition, Dec. 7–9, 1994. pp. 77–86.

In an input interface for conventional on-line handwritten character recognition, the user inputs handwritten characters one at a time in each of pre-determined substantially square areas (input frames) on an input unit such as a tablet. The user's work of inputting the handwritten characters one at a time in each of the designated frames puts much stress on the user, which is considerably different from the user's usual work of writing characters on a regular paper sheet. For example, when a user writes words such as English ones in alphabetical characters on a paper sheet, the user usually writes them by hand in a cursive fashion, and it is unusual to write characters separately one by one. Even when Japanese words are written, the characters of the words are considerably uneven in size and space, so that when written freely, the words are hardly disposed at the positions, respectively, corresponding to the respective input frames disposed at equal intervals. Thus, this input interface is never regarded as a user friendly interface.

In order to solve such problems, various on-line character recognition methods have been developed in which character recognition is possible without provision of input frames, as disclosed in the above documents 2–5. If no input frame is provided for each character, it is very difficult to accurately divide data of a plurality of handwritten characters inputted in a cursive fashion into segments each representing one character, (although it depends on the user's characteristics in writing). Thus, segmentation of the data at a position which the user does not intend is likely to occur, causing wrong recognition.

At present, for segmentation of Japanese characters including Chinese characters and alphabetical characters inputted in block letters, a projection method is used in which the handwritten character data inputted on a two-dimensional plane is projected in various directions in the plane to find a blank space existing between adjacent characters, which is regarded as a break between the characters. With this projection method, however, it is difficult to discriminate a blank space which exists inherently in one of the characters from a blank space which exists between adjacent characters, Hence, the character data can be segmented at wrong positions. For example, it is very difficult to discriminate handwriting of two Japanese katakana characters "丿" and "リ" from that of a Chinese character "川", or handwriting of two Japanese katakana characters "丿" and "レ" from that of a single Japanese katakana "ル" or handwriting of two numerals "13" from that of an alphabetical character "B" in block letter, or handwriting of Chinese two characters "あい" and "力" from that of "愛". A plurality of alphabetical characters are often handwritten and inputted in one stroke or in a cursive fashion. In one conventional method of dividing data of a plurality of handwritten characters, inputted in a cursive fashion, into segments each representing one character, the moving direction of a pen point as it occurs when a character is written is detected and a position where the moving direction of the pen point changes from any particular direction to another is determined as the position for segmentation. However, this method has also a problem that it is difficult, for example, to distinguish "d" from "cl".

In any employed segmentation method, once the segmentation is made at a wrong position, the next segmentation is carried out based on the wrong position, resulting in that the segmentation at the wrong position continues to provide adverse effects on the process.

In order to carry out the segmentation at correct positions, the use of the aspect ratio of each character has been tried. This method is intended to prevent segmentation of the trace of, for example, lateral handwriting at a wrong position by avoiding segmentation at a horizontal distance extremely short compared to the height of the trace. However, the aspect ratio of handwritten character greatly changes depending on the writer and also the type of the character. Thus, even with this method it is difficult to reduce the errors in position of segmentation. For example, in the case of "動" and "証" or "i" and "W", the aspect ratios of those characters are different from each other so that when those characters are segmented according to the same criterion, any of those characters can not necessarily be segmented at its correct position. In addition, it is also difficult to find a criterion in segmentation of handwriting common to different users, according to which any handwriting by different users can be segmented at a correct position.

The "on-line character recognition" indicates recognition of inputted characters while monitoring a process of inputting the characters, in contrast with off-line character recognition in which stationary characters recorded on a recording medium are recognized. Thus, in the off-line character recognition, each of the inputted characters is recognized on the basis of its shape and positional relationship alone. In the on-line character recognition, the order of strokes in writing of inputted characters is additionally used as information for the character recognition.

In the description below, a "character" points out one which corresponds to a character code in a one-to-one relationship. More specifically, it indicates the name of what is pointed out definitely by such character code. "Ink data" points out locus data which the user has inputted with an input device such as a pen. "Gesture" points out a kind of ink data used to call or perform a specified function. The term "handwritten character input" points out the operation of inputting ink data which is an object of character recognition. The term "handwritten character" points out ink data inputted by the user to be subjected to a handwritten character recognition process. "Character segmentation" indicates extraction of a part of ink data corresponding to one character from ink data of handwritten characters. "Character learning" indicates record or entry of quantities of features obtained from the ink data in a dictionary used for character recognition.

A "distance" is referred to as a "recognition error quantity" and indicates a scale which quantitatively represents the difference between any two of ink data or data (feature quantities) indicative of the features in the shape of a character candidate. For example, when data is represented by feature vectors in a feature space, the distance is defined by the difference between two feature vectors. As the distance becomes smaller, the degree of coincidence of the two datum becomes greater. When a character candidate corresponding to segmented ink data is found by searching a recognition dictionary on the basis of the segmented ink data, and the distance between the feature data corresponding to the character candidate and the ink data becomes smaller, the found character candidate has a stronger probability that it is the character intended by the user. Representation of characters with their feature quantities or vectors in the feature space is disclosed in the document 1, mentioned above.

A "character cluster to be recognized" points out one or more datum representing the features of a character to be recognized. When feature vectors are produced from ink data to perform a character recognition process, one or more feature vectors are set for each of characters to be recognized. The one or more feature vectors are referred to as a "character cluster to be recognized" generally. The feature vectors are encoded and the resulting codes are stored in a recognition dictionary. For simplicity, the "character cluster" is also used to indicate such coded feature quantities or feature vectors. A "weighted cluster" indicates a wrong character, which may be derived from wrong segmentation and wrong recognition, stored along with an object character in the form of coded feature quantities or feature vectors in a weighting dictionary.

As described above, in a handwritten character recognition system using no input frames, it is difficult to correctly extract, from handwritten character data inputted in a cursive fashion, a part thereof corresponding to one character. Thus, character recognition may be performed on the basis of handwritten character data segmented at wrong positions, so that the improvement of the recognition rate can not be expected.

When on-line handwritten character recognition is performed on the respective characters inputted with no input frame, character segmentation is possible to be performed wrongly, so that the user's correction of the segmentation is indispensable after the character recognition. Conventionally, this correction has been performed in such a manner that the user indicates a wrongly recognized portion of a character string with a gesture, inputs a handwritten character again, and performs the character recognition on the basis of the newly inputted ink data. However, this method not only requires the additional character inputting operation but also involves a problem that the newly inputted ink data may again be recognized wrongly in dependence on the user's characteristics in writing.

SUMMARY OF THE INVENTION

It is therefore a first object of the present invention to provide a handwritten character recognition method including the step of dividing ink data indicative of a plurality of characters inputted with no input frame into a plurality of segments, each representing one character, so as to satisfy a pre-determined condition wherein when there are at least two different combinations of the divided segments, both of which satisfy the predetermined condition, the above step further includes a step of selecting one of the combinations of segments by which the characters intended by the user can be recognized correctly.

A second object of the present invention is to provide a handwritten character recognition apparatus which performs the above process.

A third object of the present invention is to provide a handwritten character recognition apparatus including character input means for inputting a plurality of characters without designating input frames, wherein when ink data indicative of the plurality of inputted characters are divided into a plurality of segments, each representing one character, any wrong segmentation is easily corrected and wrong segmentation derived from the user's characteristics in writing is hardly repeated.

According to the present invention, there is provided a method of recognizing handwritten characters including the steps of: preparing a recognition dictionary in which a plurality of characters and corresponding character clusters are registered, and a weighting dictionary in which weighting clusters and object characters corresponding thereto are registered; setting all segmentation position candidates in segmentation of handwritten character ink data, each of the position candidates being separated in a direction corresponding to a direction in which the handwritten character ink data is inputted from a leading position of the ink data and satisfying a predetermined condition; selecting a character candidate corresponding to a segment of the ink data segmented at each of the segmentation position candidates by referring to the recognition dictionary and calculating a distance between the selected character candidate and a corresponding character cluster; referring to the weighting dictionary and when there exists one of the weighting clusters registered in the weighting dictionary which is similar to any one of the segments of the ink data segmented at the segmentation position candidates, respectively, and the object character of said one weighting cluster coincides with one of the character candidates corresponding to the respective segments, weighting the distance value calculated for the one of the character candidates; and determining ranking of the character candidates in accordance with the weighted distance values thereof.

In a preferred embodiment, the handwritten character recognition method further includes the step of, when another character candidate other than the character candidate determined as a first ranking in the step of determining the ranking is finally designated, checking whether there exists a cluster of a different character included in any of the segments obtained at the respective segmentation position candidates and having a smaller distance than the distance between the corresponding ink data and the cluster of the different character; and if it exists, registering in the weighting dictionary a segment of the ink data obtained at the segmentation position candidate being the remotest from its leading position as a weighting cluster with the upper ranking character candidates as an object character.

According to the present invention, there is also provided a handwritten character recognition apparatus including: input means for inputting characters in a handwriting manner; storage means for storing ink data of the inputted handwritten characters; a recognition dictionary in which a plurality of characters and corresponding clusters are registered; a weighting dictionary in which weighting clusters and corresponding object characters are registered;

means for determining all segmentation position candidates, which satisfy a predetermined condition, for segmentation of the ink data stored in the storage means along a direction corresponding to a direction in which the ink data is inputted from a leading position of the ink data;

means for obtaining character candidates corresponding to the segments of the ink data segmented at the segmentation position candidates, respectively, and a value of a distance between each of the character candidates and a cluster of the character candidate by referring to the recognition dictionary;

means for weighting, when there is a weighting cluster registered in the weighting dictionary at a position close to the segment of the ink data segmented at each of the segmentation position candidates and the object character of the weighting cluster coincides with one of character candidates, the distance value of one character candidate; and means for ranking the character candidates based on the distance values, or the weighted distance values, if any, thereof.

In a preferred embodiment, the handwritten character recognition method further includes the step of, when the character candidate determined as a first ranking in the step of determining the ranking is different from a character which a user has intended, checking whether there exists a cluster of a different character included in any of the segments obtained at the respective segmentation position candidates and having a smaller distance than the distance between the corresponding ink data and the cluster of the different character; and if it exists, registering in the weighting dictionary a segment of the ink data obtained at the segmentation position candidate being the remotest from its leading position as a sighting cluster with the higher ranking character candidate as an object character.

In the handwritten character recognition method and apparatus of the invention, the weighting clusters are set in the weighting dictionary to prevent selection of a wrong position due to the user's characteristic in handwriting. When the inputted ink data is close similar to any weighting cluster, the object character of the weighting cluster is hardly recognized. Thus, when wrong segmentation position is selected due to the user's characteristic in handwriting, the ink data corresponding to the wrong segmentation and the character wrongly recognized and outputted are registered as a weighting cluster and its object character in the weighting dictionary to thereby prevent further occurrence of such wrong segmentation thereafter and hence achieve segmentation of the user's intended characters.

According to the present invention, there is also provided a handwritten character input device used in a handwritten character recognition apparatus, which includes: means for dividing ink data inputted by a user into at least two segments, each representing one character, at at least one segmentation position in accordance with a predetermined condition; means for displaying the inputted ink data along with the segmentation position; and segmentation position resetting means for selectively correcting and resetting the segmentation position and displaying the corrected segmentation position in place of the initially displayed segmentation position.

The original ink data inputted by the user is displayed along with its segmentation position. In addition, the segmentation position is corrected and reset in accordance with the user's instruction. Thus, the user is able to confirm whether segmentation has been performed at his intended position. If the segmentation is performed at a wrong position, the user can designate a correct position of segmentation. Thus, the wrong position of segmentation can be corrected without inputting the character again to thereby greatly improve operability.

BRIEF DESCRIPTION OF THE DRAWINGS

FIG. 2 is a diagram for explaining a candidate position where ink data of Japanese characters is segmented;

FIG. 3 is a diagram for explaining a weighting dictionary for ink data of Japanese characters;

FIGS. 4A and 4B are diagrams for explaining a candidate position where ink data of alphabetical characters which are inputted separately from one another is segmented and a weighting dictionary, respectively;

FIGS. 5A and 5B are diagrams for explaining a method of detecting a candidate position where ink data of characters written in a cursive fashion is segmented;

FIG. 7 is a flow chart indicating a character recognition process;

FIG. 8 is a flow chart indicating a learning process;

DESCRIPTION OF THE PREFERRED EMBODIMENTS

Figure 1:
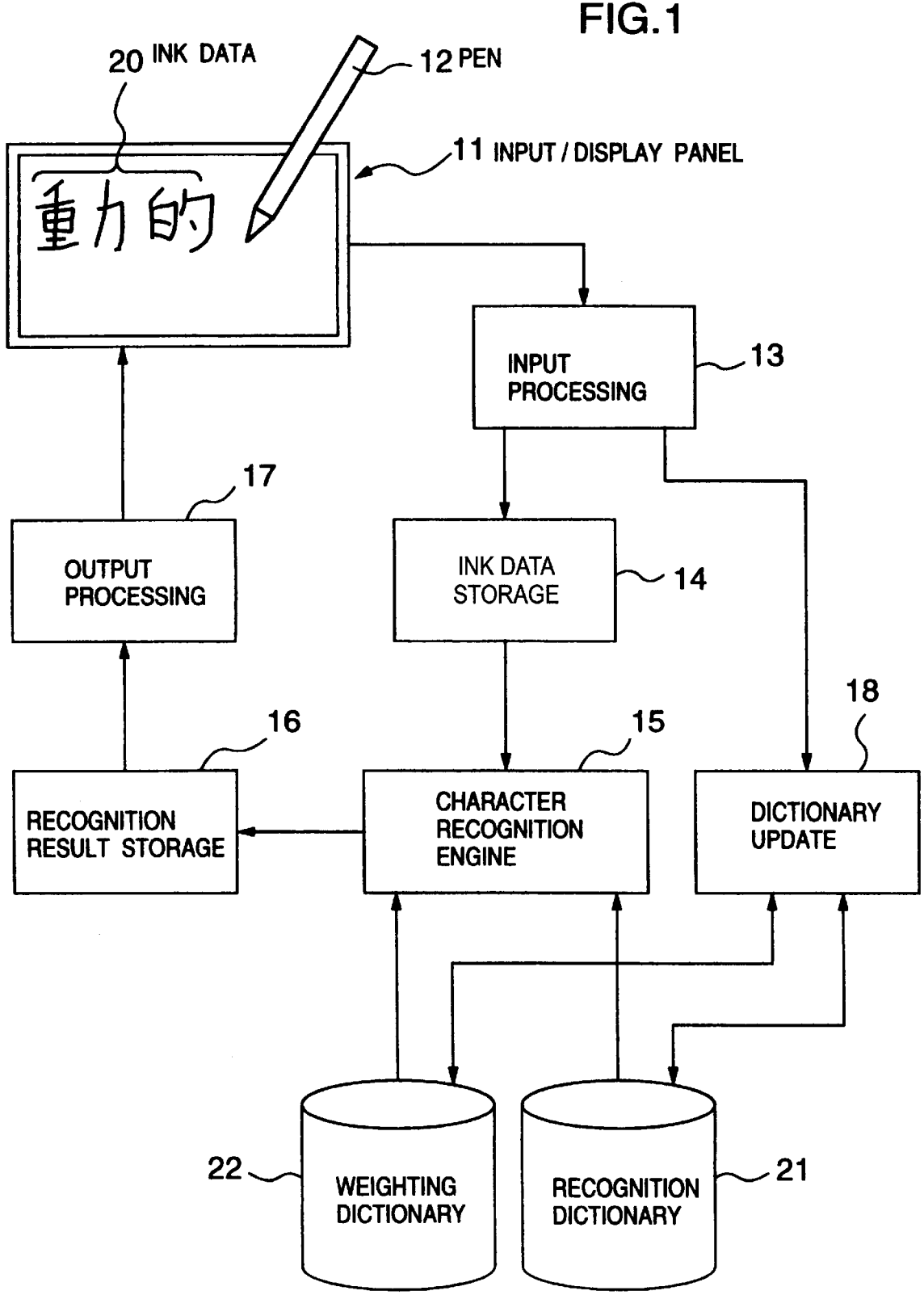
FIG. 1 is a block diagram indicating the structure of a handwritten character recognition apparatus according to a first embodiment of the present invention.

An embodiment of a handwritten character recognition method according to the present invention will be described below with reference to the drawings. FIG. 1 is a block diagram indicating the construction of a handwritten character recognition apparatus as an embodiment of the present invention. The handwritten character recognition apparatus performs an on-line handwritten character recognition process, and includes an input/display panel 11 which is used for inputting by a user ink data and also for displaying required information thereon; an input processing unit 13 which receives ink data inputted to the panel 11 and designates in a well-known manner whether the received data is handwritten character data or instruction data; an ink data storage 14 which stores ink data of handwritten characters; a recognition dictionary 21 used for character recognition; a weighting dictionary 22 which stores weighting clusters; a character recognition engine unit 15 which performs character segmentation and recognition processes on ink data stored in the ink data storage 14 by referring to recognition dictionary 21 and weighting dictionary 22; a recognition result storage 16 which stores the result of the character recognition by the character recognition engine unit 15; an output processing unit 17 which causes the result of the character recognition to be displayed on the input/display panel 11; and a dictionary update unit 18 which updates the dictionaries 21 and 22 on the basis of instructions from the user. The input/display panel 11 is an integral unit for inputting and displaying of ink data 20, and has a structure in which, for example, a transparent tablet layer is superimposed on a liquid crystal flat display. The user can input desired ink data 20 by writing characters or patterns by a pen 12 on the display panel.

In the present invention, the character recognition is carried out by obtaining feature vectors indicating the features of the ink data segmentations, respectively, obtained by the character segmentation process, comparing each of the feature vectors obtained from the respective ink data segmentations with the feature vector (cluster) of the character (character candidate) stored in the recognition dictionary 21 and selecting one of the character candidates corresponding to the ink data depending on the distances of the former feature vectors from the latter feature vectors. In the recognition dictionary 21, characters and a cluster of each of the characters are stored in the form of encoded feature vectors. A plurality of clusters may be registered corresponding to one character. A cluster of a character designated by the user can be additionally registered in the recognition dictionary 21. Of course, the present invention is applicable, irrespective of the type of the process or algorithm for character recognition, to any character recognition method, which does not use the feature vectors, but uses a pattern matching technique, for example.

The character recognition engine unit 15 locates segmentation position candidates on the ink data before segmentation stored in the ink data storage 14, which is within a predetermined range (segmentation position candidate search range W) in a direction corresponding to an inputting direction of the handwritten characters from the leading position (reference point 0) of the ink data, obtains a character candidate corresponding to a segment of the ink data segmented at each segmentation position candidate by referring to the recognition dictionary 21, further applying weighting to the obtained character candidate by referring to the weighting dictionary 22 and performs character recognition. The segmentation position candidates include all the positions which satisfy a predetermined condition when the ink data is divided into a plurality of segments in accordance with the predetermined condition in any conventional process as, for example, disclosed in the aforementioned documents 2 and 3.

The method of locating the segmentation position candidate may be the projection method described in "Background of the Related Art". FIG. 2 shows an actual example of segmentation position candidates located by the projection method on the ink data corresponding to a Japanese character string. In FIG. 2, two positions A and B are located as the segmentation position candidates. In the character recognition, character candidates corresponding to the respective portions of the ink data from the leading position (reference point 0) of the ink data before segmentation to the respective segmentation position candidates (in the example of FIG. 2, portions of the ink data from the reference point 0 to the segmentation position candidates A and B, respectively,) are searched by referring to the recognition dictionary 21 and the distance values of those character candidates are calculated. The distance value herein indicates the distance between a feature vector of the ink data segment at each segmentation position candidate and a cluster of the character candidate corresponding to the ink data segment. After the character recognition engine unit 15 performs a weighting process as mentioned below it sorts the character candidates according to the distance value and outputs them in an order starting from one having a smaller distance value to the recognition result storage 16.

The weighting process will be described next. FIG. 3 shows an illustrative structure of the weighting dictionary 22 for the ink data corresponding to a Japanese character. The weighting dictionary 22 contains plural sets, each including a weighting cluster and an object character for weighting of the weighting cluster. The weighting cluster is registered as a feature vector based on the ink data inputted by the user by a dictionary update unit 22 to be described below. In the example of FIG. 3, a character " 重 " is an object character to be weighted for a weighting cluster similar to a character "

". In the present embodiment, when the ink data corresponding to each segmentation position candidate has a shape similar to that registered as a weighting cluster and the object character corresponding to the weighting cluster is one of the character candidates, the distance value between the one character candidate and the corresponding feature vector is weighted. The weighting methods include a method of adding a constant value to the distance value of the character candidate which is to be weighted or a method of adding to the distance value of the character candidate a value changing in dependence on the distance between the feature vector of ink data corresponding to the segmentation position candidate and the weighting cluster. It is desired to carry out the weighting based on a value proportional to the degree of closeness to the weighting cluster. After all, when any ink data is registered as a weighting cluster, and ink data similar to the weighting cluster is inputted, the object character for the weighting cluster is hardly adopted by the character recognition. When selection of a wrong segmentation position is made due to the user's characteristic on handwriting, the ink data corresponding to the resulting wrong segmentation and the wrongly recognized and outputted character are registered as a weighting cluster and a corresponding object character, respectively, in the weighting dictionary 22 so that such wrong segmentation hardly occurs thereafter.

While the segmentation position candidate and the weighting dictionary have been described with reference to ink data corresponding to a Japanese character string including Chinese character, the present invention is applicable not only to ink data of a Japanese character string but also to ink data of characters of other kinds such as, for example, alphabetical and arabian characters. The processing of ink data of an English character string of alphabetical characters will be described as an example of the ink data other than that of the Japanese character string.

FIGS. 4A and 4B correspond to FIGS. 2 and 3, respectively, and illustrate a segmentation position candidate for ink data of block letters of alphabetical characters inputted separately one by one and a weighting dictionary for the ink data. A segmentation method similar to that used in the case of Japanese characters is applicable to ink data of an alphabetical character string of block letters, so that it is possible to segment the ink data which includes mixed Japanese characters and alphabetical characters in the form of block letters and recognize each character by using the handwritten character recognition apparatus of this embodiment. FIG. 4A shows two positions P and Q located as segmentation position candidate for ink data 20a in the segmentation position candidate search range W. A character candidate in the segment of the ink data extending from the reference point O to the segmentation position candidate P is, for example, "1" and a character candidate in the segment of the ink data extending from the reference point O to the segmentation position candidate Q is, for example, "B". In the arrangement of the weighting dictionary 22 of FIG. 4B, the numeral "1" is indicated as an object character for weighting (in an upper row shown) of a weighting cluster very similar to the segment of the ink data 20a extending from the reference point O to the segmentation position candidate Q in FIG. 4A, while a capital letter "B" is indicated as an object character for weighting of a weighting cluster very similar to a numeral "13" (shown in a lower row).

Character recognition of the ink data of alphabetical characters inputted in a cursive fashion will be described next. In this case, the projection method is not necessarily an appropriate character segmentation method. Therefore, a segmentation position candidate locating process is used in which the moving direction of the pen point is detected continuously in the handwriting character inputting operation and if there is a change in the moving direction of the pen point at any particular position, this position is located as a segmentation position candidate. FIGS. 5A and 5B illustrate the detection of the segmentation position candidate used in this method with an arrow indicating the direction of handwriting. A point where the movement of the pen point changes from a direction toward a lower right-hand point from an upper left-hand point to a direction toward an upper right-hand point from the lower left-hand point (FIG. 5A) and a point where the movement of the pen point changes from a direction from left to right to a direction toward a lower left-hand point from an upper right-hand point (FIG. 5B) are located as segmentation position candidates (each shown by a cross).

Figures 6A, 6B:
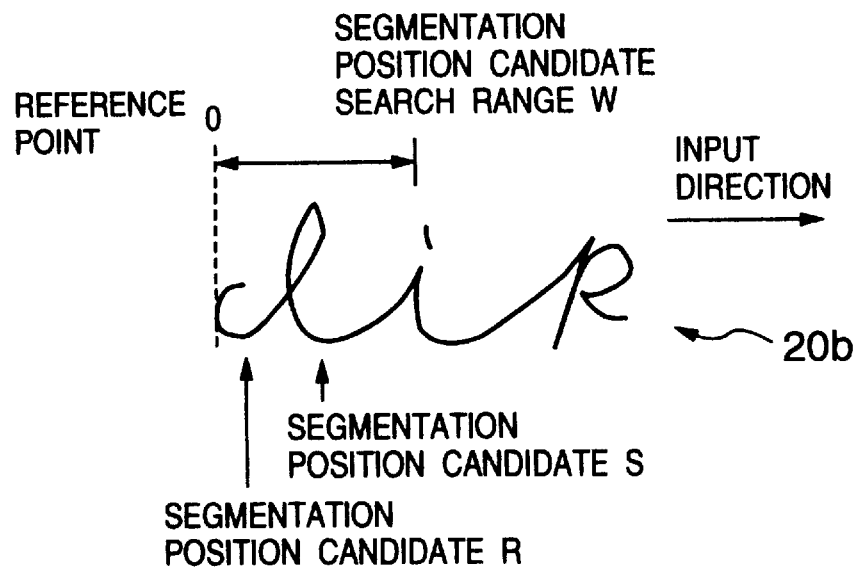
FIGS. 6A and 6B are diagrams for explaining how a position candidate in ink data of alphabetical characters which are inputted in a cursive fashion is segmented and a weighting dictionary, respectively.

FIGS. 6A and 6B correspond to FIGS. 2 and 3, respectively, and are diagrams for explaining segmentation position candidates for the ink data of alphabetical characters inputted in a cursive fashion, and a weighting dictionary for the ink data. FIG. 6A shows two points R and S located as segmentation position candidates for the ink data 20b within the segmentation position candidate search range W. A character candidate in the segment of the ink data extending from the reference point O to the segmentation position candidate R is, for example, "c" and a character candidate in the segment of the ink data extending from the reference point O to the segmentation position candidate S is, for example, "l". In the weighting dictionary 22 of FIG. 6B, the character "d" is indicated as an object character (in an upper row shown) for weighting of a weighting cluster very similar to that of the ink data 20b extending from the reference point O to the segmentation position candidate data S in FIG. 6A, while a character "c" is indicated as an object character (shown in a lower row) for weighting of a weighting cluster very similar to the ink data " d ".

When a character is segmented from handwritten alphabetical character data, usually an algorithm for determination of a segmentation position candidate varies in dependence on whether the characters are inputted separately one by one or in a cursive manner. To this end, it is desired to provide a weighting dictionary used when the characters are inputted separately one by one and a weighting dictionary used when the characters are inputted in a cursive manner separately and to select a character recognition and segmentation process suitably depending on how the characters are inputted. Whether the alphabetical characters of the ink data are inputted separately one by one or in a cursive manner can be distinguished in dependence on the degree in expansion of each stroke of the ink data or the presence or absence of a blank area in the series of ink data. Thus, how the ink data have been inputted is determined after the handwritten characters are inputted, and one of the character recognition and segmentation processes suitable for the respective cases is selected according to the result of determination. In any event, the segmentation is well known and further description thereof will be omitted.

The dictionary update unit 18 updates the recognition dictionary 21 or the weighting dictionary 22 when the user designates learning. When the user performs a learning because wrong segmentation has occurred, wrongly segmented ink data is registered as a weighting cluster in the weighting dictionary 22. In this case, the ink data segmentation extending from the character segmentation reference point to the most remote segmentation position candidate is registered. When the wrong segmentation has occurred owing to the absence of an appropriate cluster in the recognition dictionary 21, the designated ink data is registered as a cluster of a character to be recognized in the recognition dictionary 21. When the dictionary update unit 18 newly registers the weighting cluster, if there is another existing weighting cluster near the newly registered weighting cluster, the dictionary update unit 18 erases the existing weighting cluster from the weighting dictionary 22. A specified process performed in the dictionary update unit 18 will be described later with reference to a flow chart of FIG. 8.

The operation of the handwritten character recognition apparatus will be described next. First, the flow of a character recognition process will be described with reference to a flow chart of FIG. 7.

First, of ink data inputted by the user substantially without interruption in time is obtained (step 101). The obtained ink data is delivered to the character recognition engine unit 15. Segmentation position candidates are located within the segmentation position candidate search range W (step 102). An ink data segment is fetched out at each of the segmentation position candidates and the feature vector of each ink data segment is calculated. Then, the character candidate corresponding to each of the segmentation position candidates is acquired by searching the cluster registered in the recognition dictionary 21 and having a distance from the feature vector smaller than a predetermined value (step 103). In this case, the distance between the cluster of the corresponding character candidate and the feature vector of the ink data segment is calculated, the number of character candidates may be one or more at each of the segmentation position candidates.

The weighting dictionary 22 is then searched to determine whether there is any ink data segment close or similar to the weighting cluster among the fetched ink data segments (step 104A). This search is performed by detecting whether the distance in the feature space between the feature vector corresponding to the ink data segment obtained at each segmentation position candidate and the corresponding weighting cluster is equal to or less than a predetermined threshold value r. If there is no ink data segment similar to the weighting cluster, the process passes to step 106 and if there is any ink data segment similar to the weighting cluster, a character registered as the object character of the weighting cluster in the weighting dictionary 22 is read out from the weighting dictionary 22. It is then determined whether the object character coincides with any one of the character candidates already obtained (step 104B). If so, the distance value of the coinciding character candidate is weighted (step 105). If not, the process passes to step 106.

In the step 106, the respective character candidates are sorted according to the distance value and arranged in an order starting from the one having the smallest distance value. The distance value may depend on the number of strokes in the ink data according to the definition of the distance value. In that case, normalization is performed to allow the comparison between the ink data segments having different numbers of strokes. The sorted character candidates are delivered from the character recognition engine unit 15 to the recognition result storage 16, and displayed by the output unit 17 on the input/display panel 11 (step 107). In the display of character candidates, only the most likely character candidate or the one having the smallest distance value after the weighting process is first displayed, and the next ranking character may be displayed by the user's designation or several character candidates may be displayed according to the sorting sequence. Thereafter, one of the character candidates is fixed by the user's designation (step 108). At this time, when the character candidate having the first ranking is not the one which the user intends, the user checks the character candidates having the next or subsequent ranking to designate and fix his intended character candidate. The ink data up to the segmentation position candidate corresponding to the fixed character candidate is no longer required to be processed and the segmentation starting position (reference point O) is advanced to the next one and it is determined whether there exists any unsegmented ink data (step 109). If exists, the process returns to step 102 to repeat the above-mentioned steps and if not, the process is terminated.

Since in the handwritten character recognition apparatus, one character candidate is obtained at each segmentation position candidate, character candidates whose segmentation positions are different from each other such as, for example, " 動 " and " 重 " or "B" in a block letter and a numeral "1", or "d" and "c" in a cursive fashion exist concurrently. No character segmentation position is fixed when the character candidates are displayed to the user. When one of the character candidates is fixed, one of the segmentation position candidates corresponding to the fixed character candidate is also fixed as the segmentation position. Thus, the character segmentation has been performed finally.

This will be described hereinafter by example. Ink data 20 of FIG. 2 is inputted as handwritten characters by the user who intends to input a Japanese character string " 動的 ". In the ink data, the left-and right-hand radicals of the first Chinese character " 動 " are much spaced. A character candidate at each segmentation position candidate for this ink data 20 and a distance value of the character candidate are shown in Table 1 below. As shown in Table 1, if the character candidates are ranked with the unweighted distance values, the distance value of the " 重 " is smaller than that of the " 動 ". Thus, the character candidate having the first ranking is " 重 ", resulting in wrong character segmentation.

TABLE 1

| Segmentation position candidate | Ink data | Character candidate | Distance value | Weighting quantity | Weighted distance value |
|---|---|---|---|---|---|
| A | 重 | 重 | 3 | +3 | 6 |
| B | 重刀 | 動 | 5 | — | 5 |

Assume that a weighting cluster, as shown in FIG. 3, (very similar to the character " 動 " included in the ink data 20 of FIG. 2) is registered with an object character " 重 " in the weighting dictionary 22. In this case, since the ink data at a segmentation position candidate B is closer to the weighting cluster, the character candidate " 重 " is weighted. The weighted value is obtained on the basis of a rule predetermined such that as the distance value indicating the distance between the ink data at the segmentation tion position candidate B and the character candidate is smaller, the weighting value is larger. As a result of this weighting process, the distance value of the character candidate " 動 " remains unchanged while the distance value of the character candidate " 重 " increases so that the distance value of the " 重 " becomes smaller than the distance value of the character candidate " 重 ", resulting in the character candidate of the first ranking being " 動 ". Thus, correct character segmentation has been performed in accordance with the user's characteristic in handwriting. When the user intends to write " 重力 ", the ink data at this time would be different from the ink data inputted when the user intends to write " 動 ". Therefore, the former ink data should be different from the above-mentioned weighting cluster, so that the " 重 " is not weighted, resulting in correct segmentation of " 重 " and " 力 ".

In another case, the ink data, which the user has inputted to indicate characters " 重力 ", may be recognized as " 動 " by wrong segmentation, if the characters " 重 " and " 力 " are very close to each other in the ink data. Such wrong segmentation can be prevented by registering the ink data included in a segment segmented at one of the position candidates remotest from the segmentation reference point as a weighting cluster and the character " 動 " as the object character in the weighting dictionary so that the ink data is correctly recognized as " 重力 " thereafter.

An example of the character recognition and segmentation process for an alphabetical character string will be described next. The ink data 20a of FIG. 4A is handwritten characters which the user has inputted to indicate characters "BAG" in block letters. The left-hand vertical line of the character "B" is greatly separated from its right-hand part so that the character may be read wrongly as a numeral "13". Table 2 below shows a character candidate at each segmentation position candidate of the ink data 20a and a distance value of that character candidate. As shown in table 2, when the characters candidates are ranked with the distance values before weighting, the character candidate having first ranking is a numeral "1", apparently derived from wrong character segmentation.

TABLE 2

| Segmentation position candidate | Ink data | Character candidate | Distance value | Weighting quantity | Weighted distance value |
| --- | --- | --- | --- | --- | --- |
| P | 1 | 1 | 10 | 5 | 15 |
| Q | 13 | B | 10 | — | 10 |

Assume now that weighting clusters are registered as shown in FIG. 4B in the weighting dictionary 22. The ink data segmented at a segmentation position candidate Q is closer to the weighting cluster shown in the upper row in the weighting dictionary 22, so that the character candidate "1" is subjected to weighting. As a result, "B" is determined as the character candidate having the first ranking. Thus, it is possible to perform correct character segmentation according to the user's characteristic in handwriting.

Similarly, the ink data 20b of FIG. 6A is handwritten characters which the user has inputted to indicate characters "clip" in a cursive fashion. The characters "c" and "1" are too close to each other and compose a configuration similar to "d". Table 3 below shows a character candidate at each segmentation position candidate of the ink data 20b and a distance value of that character candidate. As shown in Table 3, when the character candidates are ranked with the distance values before weighting, the character candidate of the first ranking becomes "d", apparently derived from wrong character segmentation.

TABLE 3

| Segmentation position candidate | Ink data | Character candidate | Distance value | Weighting quantity | Weighted distance value |
| --- | --- | --- | --- | --- | --- |
| R | C | c | 15 | — | 15 |
| S | cl | d | 10 | 10 | 20 |

Assume now that weighting clusters are registered as shown in FIG. 6B in the weighting dictionary 22. The ink data at a segmentation position candidate S is closer to the weighting cluster shown at the upper row in the weighting dictionary 22, so that the character candidate "d" is subjected to weighting. As a result, "c" is determined as the character candidate having the first ranking. Thus, it is possible to perform correct character segmentation according to the user's characteristic in handwriting.

The learning process will be described with reference to FIG. 8. This learning process starts when wrong segmentation is performed on ink data and the user operates double clicks at a predetermined position on the input/display panel 11. Assume at this time that the wrongly segmented ink data is held as is. This ink data is referred to as "input data" hereinafter.

For example, one of the character candidates having a lower ranking is fixed by the user's designation in a manner as mentioned hereinbefore as a correct character of the input data (hereinafter referred to "designated character"). It is first determined whether the distance between the feature vector of the input data and the existing cluster of the designated character is equal to or less than a first threshold (step 11). If so, the process passes to step 113. If not, in step 111, it is determined that the cluster of the designated character in the recognition dictionary 21 is not appropriate for the user and then the feature vector is registered additionally as a cluster of the designated character in the recognition dictionary (step 112).

In step 113, the recognition dictionary 21 is referred to for determining whether there is a cluster of a different character closer to the feature vector of the input data than to the cluster of the designated character. The "closer" indicates that the distance value is smaller. The different character just referred to is a character of the ink data segmented at a segmentation position different from that of the designated character. If there is no such cluster, the wrong recognition is not derived from wrong segmentation, so that the learning process ends. If a cluster having the same segmentation position is present at a closer position to the feature vector of the input data, it does not imply wrong segmentation, but only a matter of wrong recognition. In this example, the feature vector of the input data is compared with the cluster. In contrast, when the recognition dictionary is edited according to a stroke count of ink data and the comparison cannot be directly made between the ink data segments having different stroke counts, the ink data segments are compared in a feature space for respective stroke counts to obtain corresponding distance values, which are then normalized properly and comparison is made between the normalized distance values.

When there is a cluster of a different character at a position closer than the position of the cluster of the designated character, in step 113, it is determined whether the distance between the cluster of the different character and the feature vector of the input data is equal to or less than a second threshold (step 114). If not, setting of the weighting cluster is not appropriate, and hence the process ends. If so in step 114, a feature vector corresponding to the ink data segmented at the remotest segmentation position candidate within the segmentation position candidate search range W is registered as a weighting cluster in the weighting dictionary 22 together with the character candidate having a higher ranking than the designated character as an object character for weighting (step 115). The weighting dictionary 22 is then referred to for determining whether there is an existing weighting cluster closer to the newly registered weighting cluster (step 116). If not, the process ends. If so in step 116, the existing weighting cluster is erased from the weighting dictionary 22 to prevent the presence of that contradictory weighting cluster and excess enlargement of the weighting dictionary 22 (step 117). Then, the processing ends. In step 115, the weighting cluster is set on the basis of the remotest segmentation position candidate within the segmentation position candidate search range W. In contrast, if a weighting cluster is based on a segmentation position candidate which is not the remotest one, the weighting process would be performed without consideration of subsequent strokes. For example, when "重さ" is inputted in the above example, there is a possibility that it is recognized as "動". It should be noted that the first and second thresholds are experimentally determined such that the most effective values are obtained on the basis of many test data results in consideration of the distance between the ink data inputted by the user and the feature vector of the intended character.

Figure 9A:
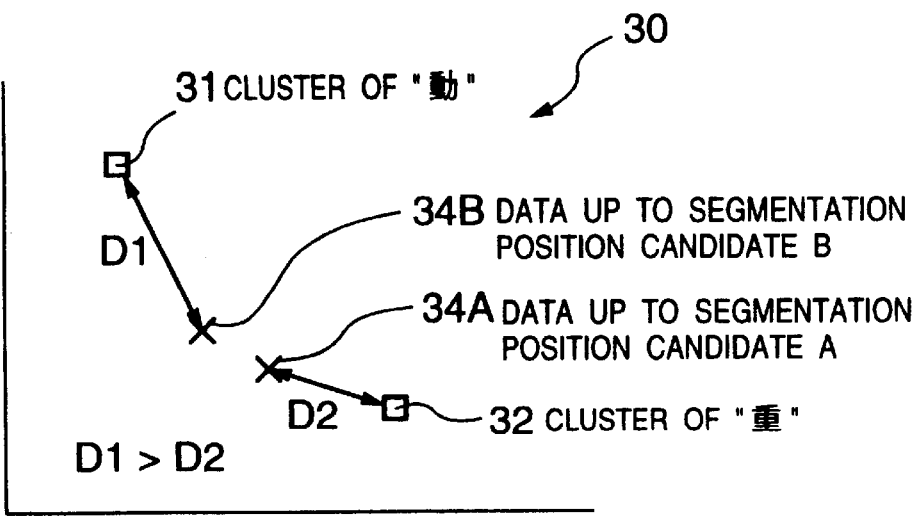
FIGS. 9A–9C are diagrams for explaining the relationship between learning and character recognition.

The learning process will be described in more detail by taking a Japanese character string as an example. When ink data 20 of FIG. 2 is inputted, assume that feature vectors corresponding to the ink data segments obtained at segmentation position candidates A and B are disposed at points 34A and 34B indicated by "x", respectively, in a feature space 30, as shown in FIG. 9A. In addition, assume that clusters of characters "動" and "重" in the recognition dictionary 21 are disposed respectively at points 31 and 32 shown by "□". The cluster closest to the point 34A is that of "重" and the cluster closest to the point 34B is that of "動", so that those characters "重" and "動" are selected as character candidates. Since the distance D1 between the points 31 and 34B is greater than the distance D2 between the points 32 and 34A, the character candidate "重" corresponding to the distance D2 has a higher ranking than the candidate "動" if no weighting process is performed. Since this ink data shown in FIG. 2 are intended to input the characters "動白ウ", wrong segmentation occurs.

Figure 9B:
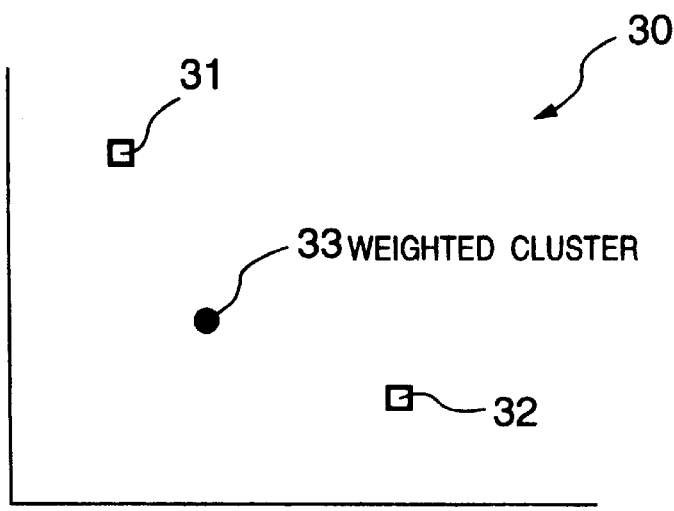
Figure 9C:
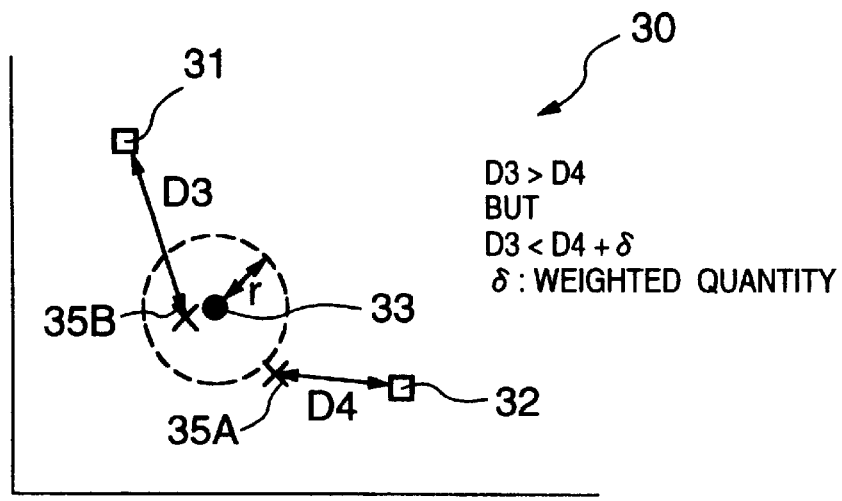

Thus, as shown in FIG. 9B, the ink data corresponding more remote one, i.e. the segmentation position candidate B within the segmentation position candidate search range W, is set as a weighting cluster 33. In this case, the object character for weighting is "重". When the weighting cluster 33 is registered in the weighting dictionary 22 and the ink data substantially similar to that of FIG. 2 is inputted, the segmentation position candidates are detected in a manner substantially similar to that shown in FIG. 2. Let the segmentation position candidates here be A and B, and assume that the ink data at those segmentation position candidates are disposed at corresponding points 35A and 35B in the feature space 30 (FIG. 9C). Also, in this case, the cluster closest to the point 35A is that of a "重", while the cluster closest to the point 35B is that of "動", so that those "重" and "動" are selected as the respective character candidates. Since the distance D3 between the points 31 and 35B is greater than the distance D4 between the points 32 and 35A, "重" is adopted for segmentation unless the weighting process is performed. However, since the point 35B is within a range of a predetermined threshold r from the weighting cluster 33, the character candidate "重" is weighted such that a weighting quantity δ is added to the distance D4 of "重". As a result, D3<D4+δ, so that "動" is segmented, resulting in correct character segmentation.

While in the above the learning process has been described by taking as an example the weighting dictionary for ink data of the Japanese character string, the learning process described herein, of course applies to the learning process for the weighting dictionary corresponding to ink data of other kinds of characters, for example, alphabetical characters written in a cursive fashion. When individual weighting dictionaries corresponding to various kinds of characters are provided, the learning process is performed for each of the weighting dictionaries corresponding to the used character.

As described above, the present embodiment is arranged such that a weighting dictionary is provided in which weighting clusters and corresponding object characters for weighting are registered and that when the input ink data is close to one of the weighting clusters, the object character of that weighting cluster is hardly recognized. Thus, when a wrong segmentation position may be set due to the user's characteristic in handwriting, the ink data corresponding to the wrong segmentation position and the wrongly recognized and outputted character are registered as the weighting cluster and its object character in the weighting dictionary to thereby suppress such wrong segmentation which would otherwise occur thereafter and hence to achieve correct character segmentation intended by the user.

In the embodiments as above-mentioned, when a plurality of character candidates are segmented from the input handwritten character ink data for character recognition, the distance between the segmented ink data and the feature vector of each character candidate is modified by weight so that the character intended by the user is selected. However, this arrangement does not necessarily provide correct segmentation of the ink data at any time.

An embodiment of a handwritten character input device which is used with the character recognition apparatus and capable of easily correcting wrong character segmentation will be described with reference to the accompanying drawings.

Figure 10:
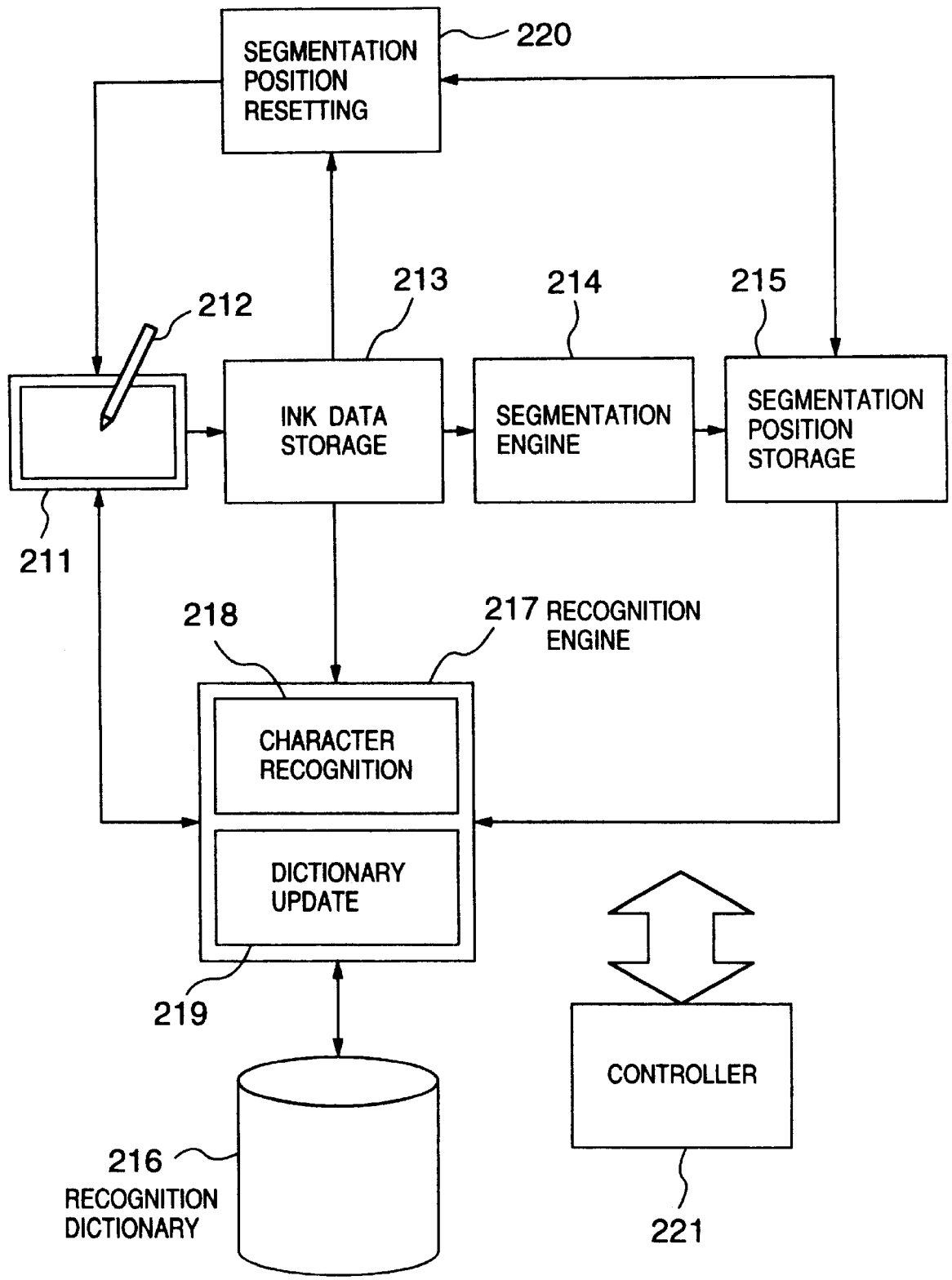
FIG. 10 is a block diagram indicating the structure of one embodiment of a handwritten character input device according to the invention.

FIG. 10 is a block diagram indicating the structure of the handwritten character input device in one embodiment of the present invention. This input device is used with an on-line handwritten character recognition apparatus and has the functions of editing a result of the character recognition, resetting the position of ink data segmentation, correcting input ink data and learning the recognition dictionary.

The input device includes an input/display panel 211 to which the user inputs ink data and on which required information is displayed, an ink data storage 213 which stores input ink data, a segmentation engine unit 214 which performs a character segmentation process on the ink data stored in the ink data storage 213, a segmentation position data storage 215 which stores the result of character segmentation by the character segmentation process as segmentation position data, a recognition dictionary 216 which is used for character recognition, a recognition engine unit 217 which performs a character recognition process on the ink data and updates the recognition dictionary 216, a segmentation position resetting unit 220 which resets a segmentation position, and a controller 221 which controls the whole device. The input/display panel 211 is an integral type input/display panel in which an input unit and a display for ink data are integrally formed in one unit such as, for example, a liquid crystal flat display on which a transparent tablet layer is superimposed. The user writes characters, etc., with a pen 212 on the display screen of the panel 211 to input desired ink data therein. In the present embodiment, the ink data inputted by the user includes not only handwritten characters but also graphic data and gesture used for calling, selecting and designating a specified function of this device.

The recognition engine unit 217 includes a character recognition section 218 and a dictionary update section 219. The character recognition section 218 divides the ink data stored in the ink data storage 213 into segments, each representing one character, successively one by one in accordance with segmentation position data stored in the segmentation position data storage 215, performs a character recognition process by referring to the recognition dictionary 216, and displays the result of the character recognition on the input/display panel 211. When the segmentation position data is changed, the character recognition section 218 again performs the character recognition in a range of the ink data to which the change of the segmentation data affected. The dictionary update section 219 updates the recognition dictionary 216 in accordance with the user's instruction by using the ink data segmented in accordance with the segmentation position data. The segmentation position resetting unit 220 reads segmentation position data by referring to the segmentation position data storage 215, displays on the input/display panel 211 the ink data stored in the ink data storage 213 along with the segmentation positions based on the segmentation position data, resets the segmentation positions for the ink data when an operation described below is performed on the displayed ink data, and updates the segmentation position data in the segmentation position data storage 215.

The operation of the present embodiment will be explained with reference to the flow chart of FIG. 11. The explanation will be made first where a Japanese word (a character string) is inputted by handwritten characters and then where an English word is inputted in handwritten characters.

When the user inputs some data to the input/display screen of the input/display panel 211, it is determined first whether the input ink data refers to graphic processing or character processing (step 301). If it refers to graphic processing, a predetermined graphic process is performed (step 302) and the process then returns to the step 301. If it refers to character processing, it is determined whether it relates to calling an editing function (step 303). If not or if it relates to an input of ink data of handwritten characters, the input ink data is stored in the ink data storage unit 213 and delivered to the segmentation engine unit 214, which determines a segmentation position for each of the characters in accordance with a predetermined algorithm, and stores them as segmentation position data in the segmentation position data storage 215. The character recognition unit 218 performs a character recognition operation on the ink data in accordance with the segmentation positions and displays the result of the character recognition on the input/display panel 211 (step 304). The process then returns to step 303. The above operation is the same as that performed by the conventional character recognition apparatus, as well known, and further description thereof will be omitted.

Figure 12A:
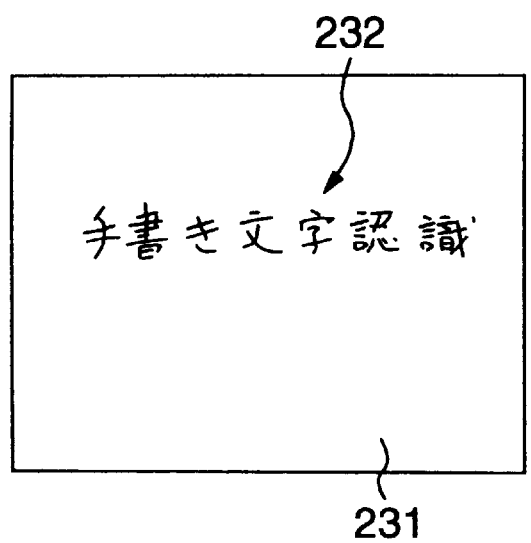
FIG. 12A and 12B are diagrams for explaining a process for sequentially segmenting ink data of Japanese characters into a plurality of segments and recognizing characters involved in the respective segments.
Figure 12B:
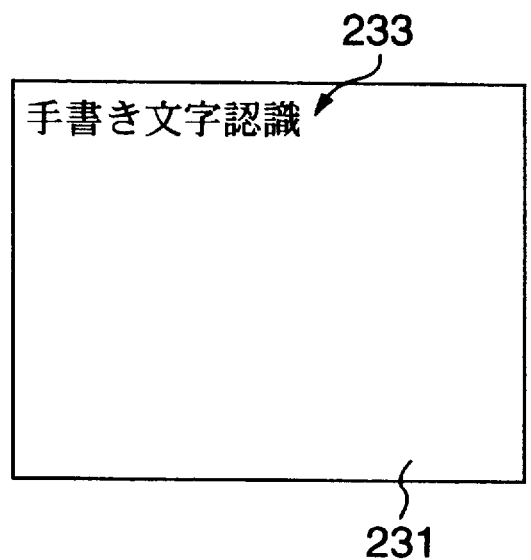

FIGS. 12A and 12B are diagrams for explaining the sequential segmentation and recognition process for the ink data of a Japanese character string in step 104. As shown in FIG. 12A, when handwritten characters 232 are inputted to the input/display screen 231 (in this case, ink data of " 手書き 大字認識 " is inputted), the character segmentation and character recognition processes are performed sequentially. As shown in FIG. 12B, a recognition resultant character string 233 is displayed on the input/display screen 231 and the display of the input ink data is cancelled. The ink data (handwritten characters 232) is still stored in the ink data storage 213 after cancellation of the display.

When it is determined in step 303 that the input ink data is for calling the editing function, or when a gesture is inputted as ink data, the gesture is evaluated as to which of the editing functions should be called (step 305). In this example, two editing functions are prepared, one for the recognized character string (normal edition) and one for ink data (processing for a correction interface (I/F) image). If the gesture indicates the normal edition, any one of character erasure process (step 306), an insertion process (step 307) and a Chinese character conversion process (step 308) is performed in accordance with the designated function. The process then returns to step 303. In step 308 Roman to Chinese character conversion may be performed instead of the Japanese kana to Chinese character conversion.

The normal edition process (for the recognized character string) will be described in the case of a Japanese character string, as an example, in more detail with reference to FIGS. 13A–13C. Those processes are performed mainly by the controller 221.

Figure 13A:
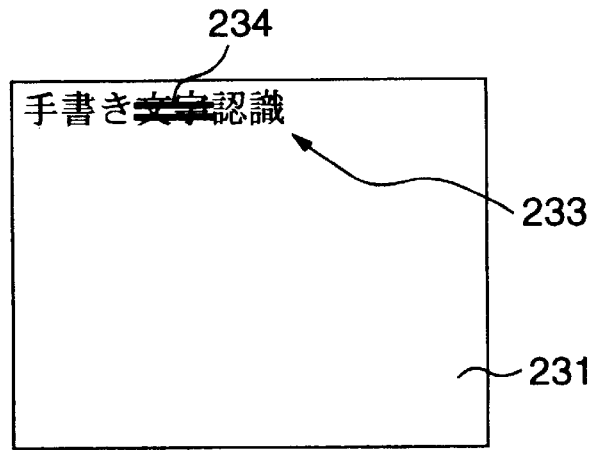
FIGS. 13A–13C are diagrams for explaining erasing process, insertion process and Chinese character conversion process, respectively, performed on recognized Japanese characters.

In the character erasure process (step 306), as shown in FIG. 13A, a gesture 234 is inputted which includes two lines drawn on a part or whole of the characters of the recognized character string 233 (in this example, " かなか 手書き 文字 ") on the input/display screen 231 so that the characters designated by the lines are erased. In this example, the character string changes to " 手書き認識 ".

Figure 13B:
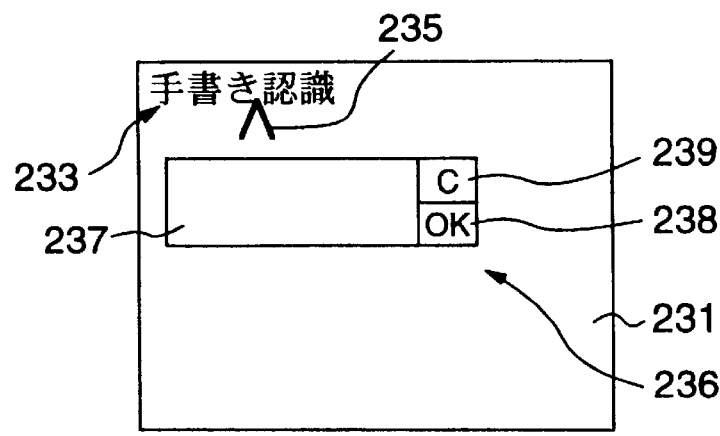

As shown in FIG. 13B, the insertion process (step 307) includes insertion of a character by inputting, for example, a " ∧ "-like gesture 235 between any characters of a recognized character string 235 on the input/display screen 231. More specifically, an insertion interface window 236 is called and opened on the input/display screen 231 by inputting the gesture 235. By inputting a handwritten character into the interface window 236, a character of the input ink data is recognized and inserted at a position designated by the gesture. The interface window 236 includes a window 237 through which a handwritten character is inputted, and buttons "OK" and "C" 238 and 239. The window 237 is a place where the ink data is actually inputted. In this case, since the number of characters to be inserted is unclear, the window 237 is first opened with a predetermined size. When no blank portion remains in the window 237 owing to an increase in the input ink data, the size of the window 237 is arranged to increase automatically to an appropriate size. The button "OK" 238 is depressed when the recognized character string is confirmed and acceptable. The button "C" 239 is used to instruct cancellation or nullification of the change caused by the current insertion process. When there is a gesture for designation of any one of the buttons 238 and 239, the interface window is closed. In addition, if the button "OK" 238 is designated, the confirmed character string is inserted into the existing recognized character string 235.

Figure 13C:
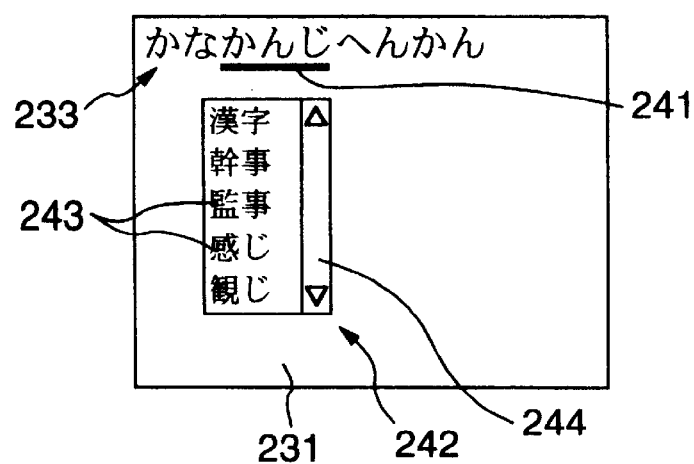

In the Japanese kana-Chinese character conversion process (step 308), as shown in FIG. 13C, Japanese kana- Chinese character conversion is performed by inputting a gesture 241 such as, for example, an underline added under a part or whole of the characters of the recognized character string 233 (in this example, " ∧ ʌɩ̂ ʌɦʌ") on the input/display screen 231. More specifically, a window 242 is opened which indicates examples of the Japanese kana-Chinese character conversion in the form of a list. By pointing out any proper character string candidate 243 in the examples of the kana-Chinese character conversion, the conversion is fixed. The window 242 has a scroll bar 244 shown by "Δ" and "∇" so that by clicking the "∇" of the scroll bar 244, the next character string candidate not shown is displayed and that by clicking "Δ", the previously displayed character string candidate is again displayed. Alternatively, only the uppermost character string candidate is first displayed and the second character string candidate is displayed by single-clicking the first displayed character string. By double-clicking the character string, it is fixed. Those erasure, insertion and Chinese character conversion processes are well known and further description thereof will be omitted.

Figure 14A:
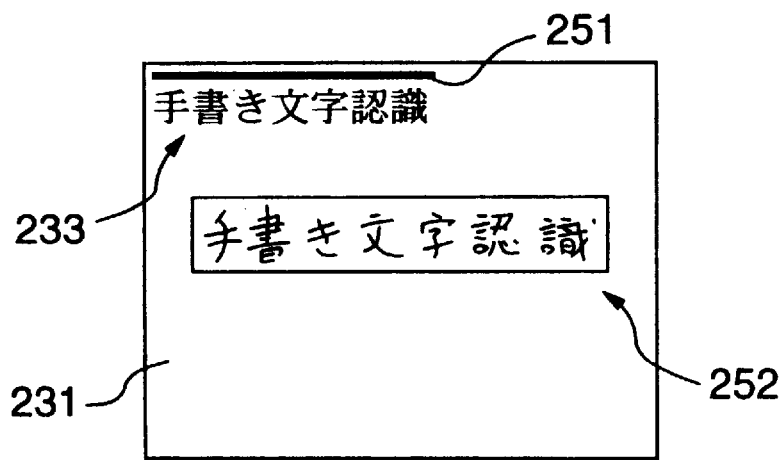
FIGS. 14A and 14B are diagrams for explaining a correction I/F display screen.

The operation of the present embodiment performed when it is determined in step 305 that the gesture is relating to the correction I/F image processing (the processing for ink data itself) in step 305 will be described next. In the present embodiment, the correction I/F image process is determined by inputting a gesture 251, for example, an overline drawn over the recognized character string 233 displayed on the input/display screen 231, as shown in FIG. 14A, and a correction I/F display screen 252 is opened as an interface window in the input/display screen 231 (step 309). The correction I/F display screen 252 is used for processing the ink data, for example, (1) correction, deletion and addition of the ink data; (2) correction of a recognized character code corresponding to the ink data; (3) learning and addition of the recognized character candidate corresponding to the ink data (learning of characters other than the character candidate); and (4) correction, deletion and addition of the character segmentation position. In addition, when a Japanese character is input, the correction I/F display screen 252 is also used for Japanese kana-Chinese character conversion and Roman-Chinese character conversion. The steps 309–317 compose a resetting process 300 for the ink data.

Figure 14B:
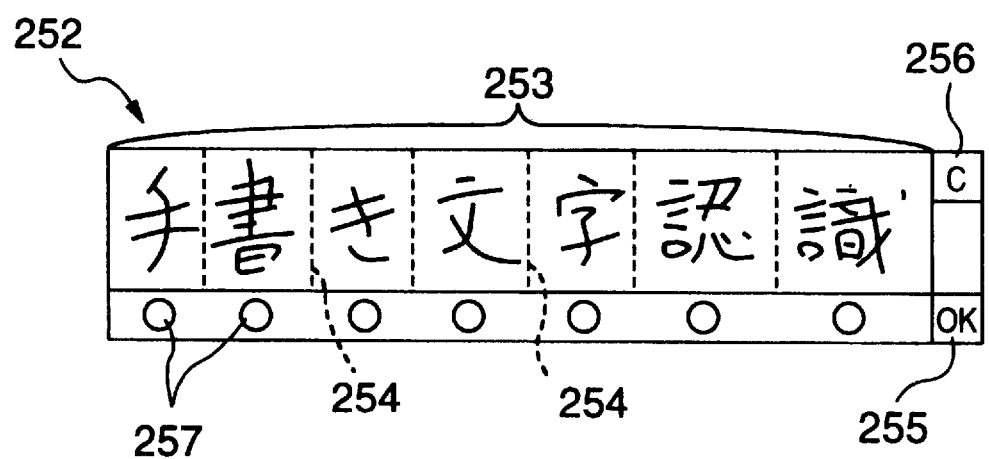

FIG. 14B shows the details of the correction I/F display screen 252, which has a window 253 in which ink data corresponding to a character string within a range designated by the gesture 251 is displayed. In addition to the ink data, the window 253 displays each of actual segmentation positions as a line-like icon 254 superposed on the ink data on the basis of segmentation position data in the segmentation position data storage 215. In the illustrated example, the icon 254 indicating each segmentation position is displayed as a vertical thick broken line. In the correction I/F display screen 252, a button 257 indicated by "O" is for character code correction and disposed at each segment of the ink data (at one character). This button is used to designate a process for character code correction, etc.

In addition, two buttons 255 and 256 for "OK" and "C" are provided. The button "OK" 255 is used to confirm the results of the user's operation and designation performed on the correction I/F display screen 252. By clicking the button "OK" 255, the result of the user's operation and/or designation is fixed to thereby close the correction I/F display screen 252. The button "C" 256 is used to cancel the user's operation and designation performed on the correct I/F display screen 252 so that when the button "C" 256 is clicked, the image on the correction I/F display screen 252 is canceled to return the screen 231 to its state just before the screen 252 is opened.

In step 309, the correction I/F display screen 252 is displayed. When any operation is performed on the correction I/F display screen 252, it is determined what is to be processed by the gesture (step 310). The process, which is performed when some correction is designated, will be described later. If the gesture or operation is intended for other than the designation of some correction, it is determined whether the end of the process is designated (step 311). The designation of the end of the process is for closing the correction I/F display screen 252, and specifically made by clicking the buttons "OK" 255 or "C" (cancel) 256. If not in step 311, the process passes to step 317 where a re-display process is performed. If the end of the process is designated, it is determined which of the buttons "OK" and "C" 255 and 256 has been clicked (step 312). If the button "OK" is clicked, the operation and designation performed on the correction I/F display screen 252 are fixed to thereby close the correction I/F display screen 252. The process then returns to step 303. When the button "C" 256 is clicked, the cancel process is performed. That is, the operation and designation performed on the correction I/F display screen 252 are nullified to thereby close the correction I/F display screen 252 (step 313). The process then returns to step 303.

In the present embodiment, a child display screen (child window) and a grandchild display screen (grandchild window) of the correction I/F display screen 252 are each provided with buttons "OK" and "C" in principle to confirm or cancel the operation and designation performed on the associated display screen and close the associated screen. The functions of the buttons "OK" and "C" on the child or grandchild display screen are the same as those of the buttons 255 and 256 on the correction I/F display screen 252, and further detailed description thereof will be omitted.

The operation of the present embodiment performed when the gesture is determined as the designation of correction in step 310 will be described next. In this case, one of an ink data correction process (step 314), a character code correction/learning process (step 315) and a segmentation correction process (step 316) is performed in dependence on the contents of the designated correction. When any one of the processes in steps 314–316 has been performed, a re-display process is performed to reflect the result of that process (step 317). For example, when the character recognition has been made again, the contents of the recognized character string 233 are changed in dependence on the result of the recognition. The process then returns to step 309.

Figure 15:
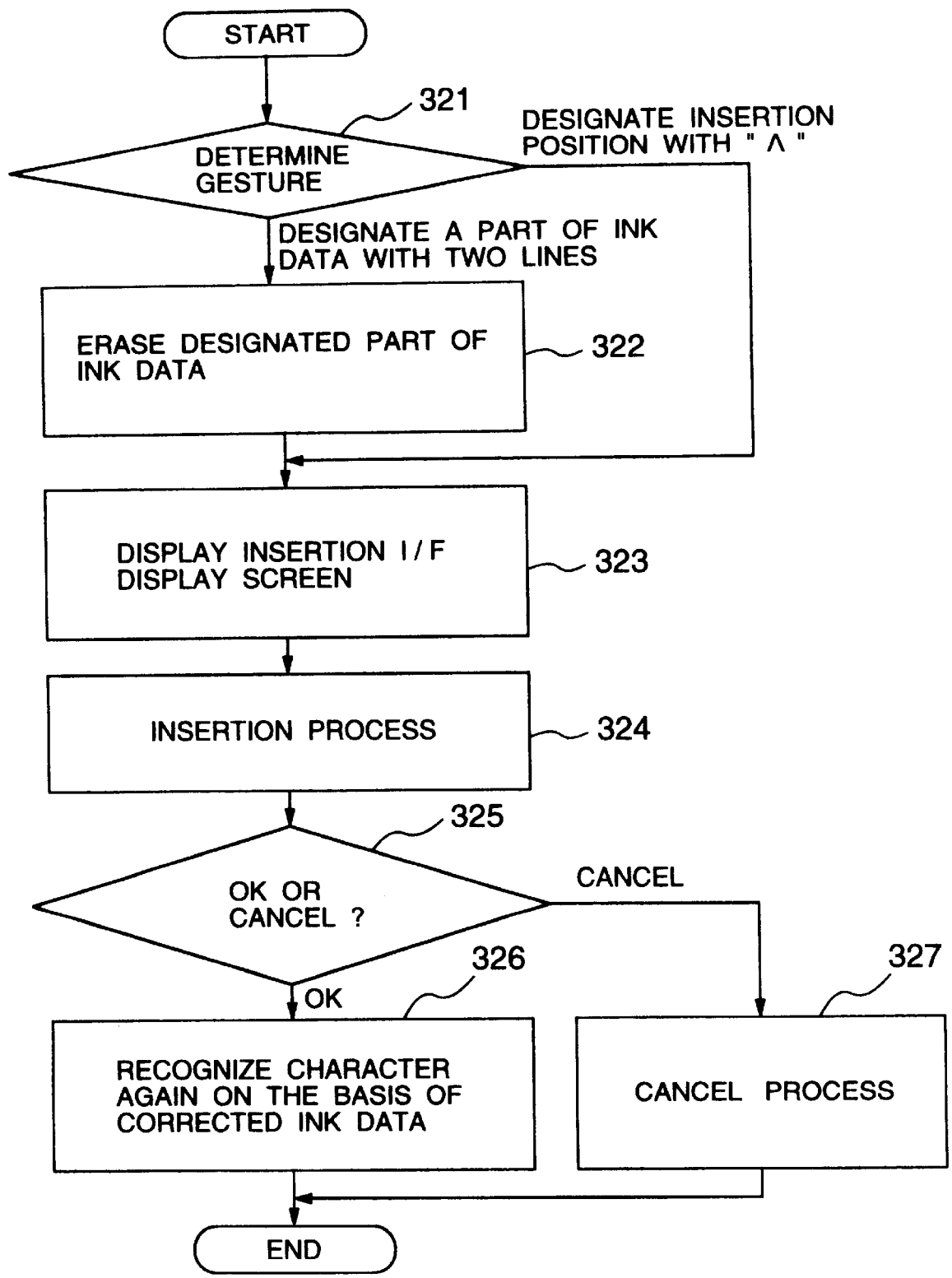
FIG. 15 is a flow chart indicating correction of ink data.

The ink data correction process will be described next with reference to a flow chart of FIG. 15. By inputting a suitable gesture on the ink data displayed on the window 253 of the correction I/F display screen 252 of FIG. 14B, the ink data itself can be corrected. In this example, by inputting a gesture, for example, of drawing two lines on a part of the displayed ink data, erasure of the part of the ink data is designated. By inputting, for example, a gesture of " ∧" at any position in the ink data, an insertion of a character is designated. First, the type of the gesture is determined (step 321). In the case of the designation of a part with two lines, that is, erasure of the part, the ink data of the designated part is erased (step 322). Also, in any case of the designation of the erasure and the designation of an insertion position with the " ∧", an insertion interface window 236 which is the same as that of FIG. 13B is opened (step 323). By inputting ink data to the main window 237 of the interface window 236, an insertion process similar to that described in step 307 of FIG. 11 is performed (step 324). When only erasure of the designated part is desired, the button "OK" 238 is clicked without inputting any ink data.

Then, it is determined which of the buttons "OK" and "C" (cancel) 238 and 239 has been clicked (step 325). If the cancel button 239 has been clicked, a cancel process is performed to close the interface window 236 (step 327), thereby ending the correction process for the ink data. If the button "OK" has been clicked, the correction of the ink data is fixed, the character recognition is again performed on the basis of the corrected ink data, and the interface window 236 is closed (step 326) to thereby end the correction process for the ink data. The character recognition in this case is performed only in a range of the ink data which the ink data correction affects. That is, the character segmentation and the character re-recognition are performed sequentially on the ink data, starting from a first character of the corrected (deleted, added) part of the ink data. When the corrected part of the ink data has been processed so that the result of the recognition before correction coincides with the result of the re-recognition after correction, the re-recognition process is stopped.

While the correction process for the ink data has been described above, it is possible to input a gesture of drawing a line on a part of the ink data displayed on the correction I/F display screen 252 or enclosing the part of the ink data in a box, thereby erasing the part of the ink data and simultaneously opening the insertion interface window 236. Alternatively, the part of the ink data to be corrected or canceled may be designated by clicking a starting and an ending stroke of the part.

Figure 16:
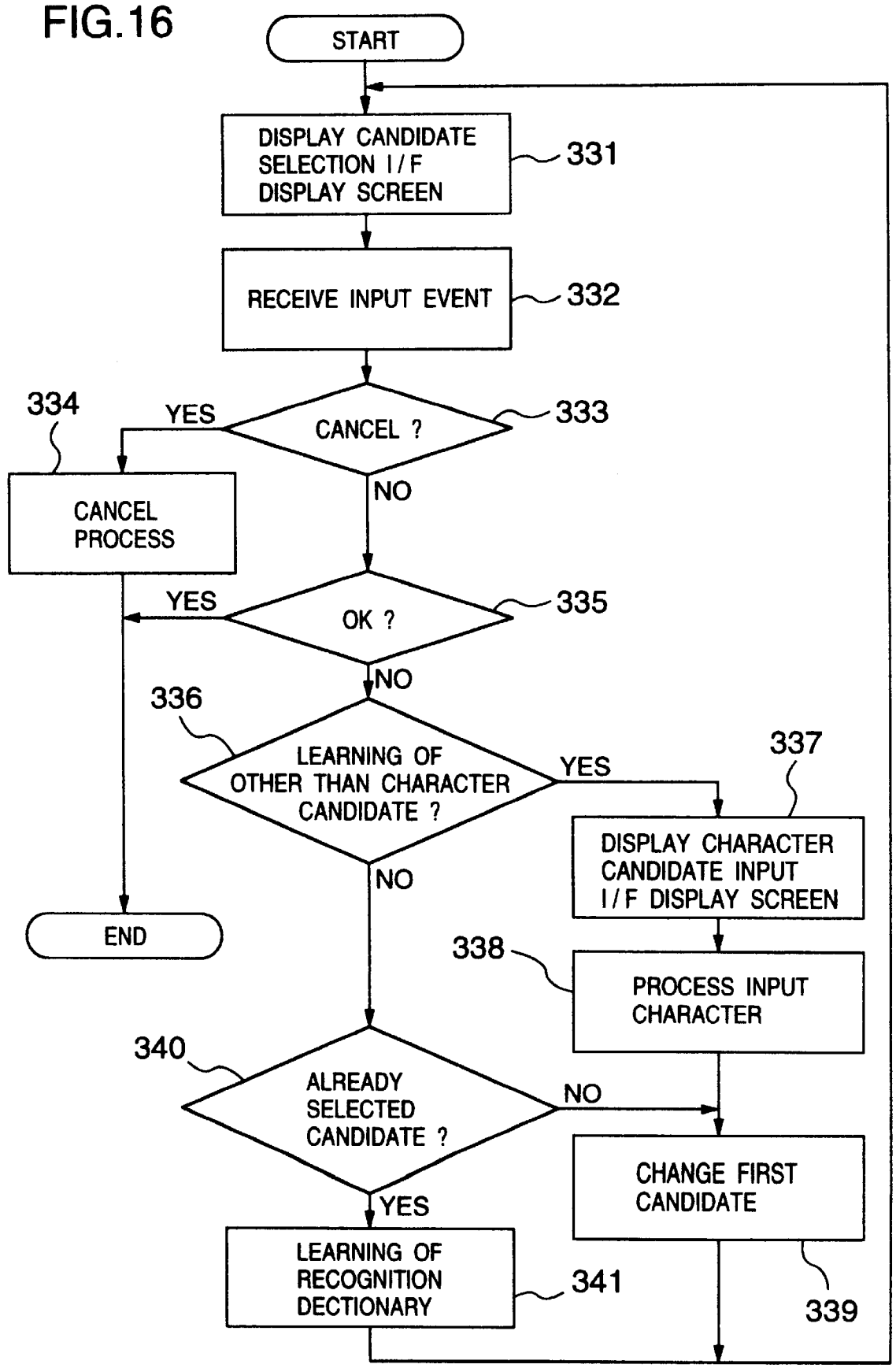
FIG. 16 is a flow chart indicating a correction/learning process for a character code.

The correction/learning process for character codes will be described with reference to a flow chart of FIG. 16, especially, in case of Japanese characters mixing Chinese character.

Figure 17A:
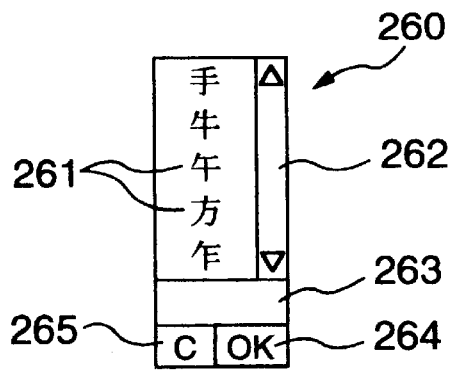
FIGS. 17A–17D are diagrams for explaining a correction/learning process for character codes for Japanese characters.

When a character code correction button 257 is clicked in the correction I/F display screen 252 of FIG. 14B, a candidate selection I/F display screen 260 of FIG. 17A is displayed (step 331). This screen 260 is used to change or learn the result of character recognition performed on a part of the ink data corresponding to one character, and display in the form of a list a plurality of character candidates 261 corresponding to the ink data. The candidate selection I/F display screen 260 has a scroll bar 262, a "learn" button 263, an "OK" button 264 and a "C" button 265. In the example of FIG. 17A, character candidates (" 手 ", " 牛 ", " 午 ", etc.) for one character of the ink data (which reads as " 手 ") at the head of FIG. 14B are displayed. By operating the scroll bar 262, additional character candidates which are not presently displayed are displayed. Alternatively, the character code correction button on the correction I/F display screen 252 may be omitted while, the correction I/F display screen 252 is displayed together with the candidate selection I/F display screen 260 for each segment of the ink data. This serves to reduce the number of times of pen operations although the area occupied on the input/display screen 231 increases.

An input event to the candidate selection I/F display screen 260 is received i.e. the clicked object is inputted (step 332). If the input event includes the operation of the scroll bar 262, the display of the candidate characters is scrolled appropriately. If one of the displayed candidate characters 261 is clicked, the clicked character candidate 261 is regarded as being selected and the recognized character string 233 is changed by the selected character candidate, which is displayed, for example, in a different color from that of other displayed character candidates or in an inverted fashion, in order to distinguish the selected character candidate from other character candidates. It is then determined whether the (cancel) button "C" 265 has been clicked (step 333). If so, a cancel process is performed (step 334) to close the candidate selection I/F display screen 260 thereby ending the character code correction/learning process. In this case, if the character candidate has been selected and the recognized character string has been changed, the original recognized character string 233 before changing is restored. Also, when a click is made outside the area of the candidate selection I/F display screen 260, cancel is regarded as being designated.

When it is determined that the button "C" 265 has not been clicked in step 333, it is determined whether the button "OK" 264 has been clicked (step 335). If so, the executed process is fixed to close the candidate selection I/F display screen 260 thereby ending the character code correction/learning process. If one of the character candidates has been selected and the recognized character string has been changed, this change is fixed. Unless the button "OK" 264 has been clicked, it is determined whether a character other than the character candidates should be learned, that is, whether the button "learn" 263 has been clicked (step 336). If so, the case may be the one where a character which is not found in the list of character candidates is desired to be used for the segmented part of the ink data or for learning of the dictionary. Thus, the character candidate input I/F display screen is displayed (step 337), and the process corresponding to the user's input to the character candidate input I/F display screen (step 338) is performed to obtain a character designated by the user.

The character candidate input I/F display screen may be a virtual keyboard 266 (FIG. 17B) or a handwriting input virtual board 270 (FIG. 17C) displayed on the input/display screen 231 which is selectively used depending on the user's preference. The virtual keyboard 266 displays many characters in the form of a keyboard so that a desired one of the displayed characters can be selected and clicked to input that character.

The handwriting input virtual board 270 is composed of a window 271 which includes a plurality of separate input frames to each of which one character is inputted, a display column 272 which displays the result of the recognition, a button "FEP" 273 which designates the execution of Japanese kana-to-Chinese character conversion, and buttons "OK" and "C" 274 and 275. By inputting ink data for one character in each of the input frames of the window 271, the recognized characters are displayed on the display column 272. The provision of the input frames is intended to ensure correct inputting. By inputting Japanese hiragana characters as ink data and then clicking the button "FEP" 273 (or inputting an appropriate gesture), the input Japanese hiragana character string is converted to a Chinese character string and as shown in FIG. 17D, a Japanese kana-Chinese character conversion window 276 is opened. Correction to ink data in the handwriting input virtual board 270 may be performed in a manner similar to the above-mentioned ink data correction process. The Japanese kana-Chinese character conversion window 276 displays conversion character candidates 277 in the form of a list and includes a scroll bar 278 similar to that mentioned above. By selecting and clicking a desired conversion character candidate 277, character inputting is performed. In the illustrated example, ink data of " 牛 " is inputted and " 午 ", " 藍 ", " 哀 ", etc., are displayed as conversion character candidates 277 corresponding to the recognized Japanese hiranaga character string. The result of the Japanese kana-Chinese character conversion is fixed and canceled by the buttons "OK" and "C" 274 and 275, respectively. Also, when an area outside of the handwriting input virtual board 270 is clicked, the "cancel" instruction is regarded as being issued as in the above case.

When one character designated by the user is inputted through the virtual keyboard 266 or handwriting input virtual board 270, the input character is placed in a selected state and disposed at a first ranking position among the character candidates 261 and the ranking positions of other character candidates are sequentially lowered one by one (step 339). Thus, even a character which is not in a list of character candidates can be designated and the appropriate character in the recognized character string 233 is changed according to the character designated by the user. The process then returns to step 331 to perform learning, as will be described later.

When the button "learn" 263 has not been depressed in step 336, it is determined whether the character candidate placed in the selected state is double-clicked (step 340). If not, the process passes to step 339 by which the character candidate placed in the selected state is rendered as the one having first ranking. When the double click operation is performed (step 340), it is determined that the learning has been designated and a feature quantity of the ink data presently segmented is added by the dictionary update unit 219 as data for the selected character to the recognition dictionary 216 (step 341). The process then returns to step 331.

In the correction/learning process of the character codes, as above-mentioned, the correction of a character code is performed and the character candidate is rendered as the one having first ranking (frequency learning) by a simple operation for selection/designation of a character candidate. By double designation or double-clicking, the feature quantity of the ink data is added to the recognition dictionary 216 (learning in a narrow sense).

Figure 18:
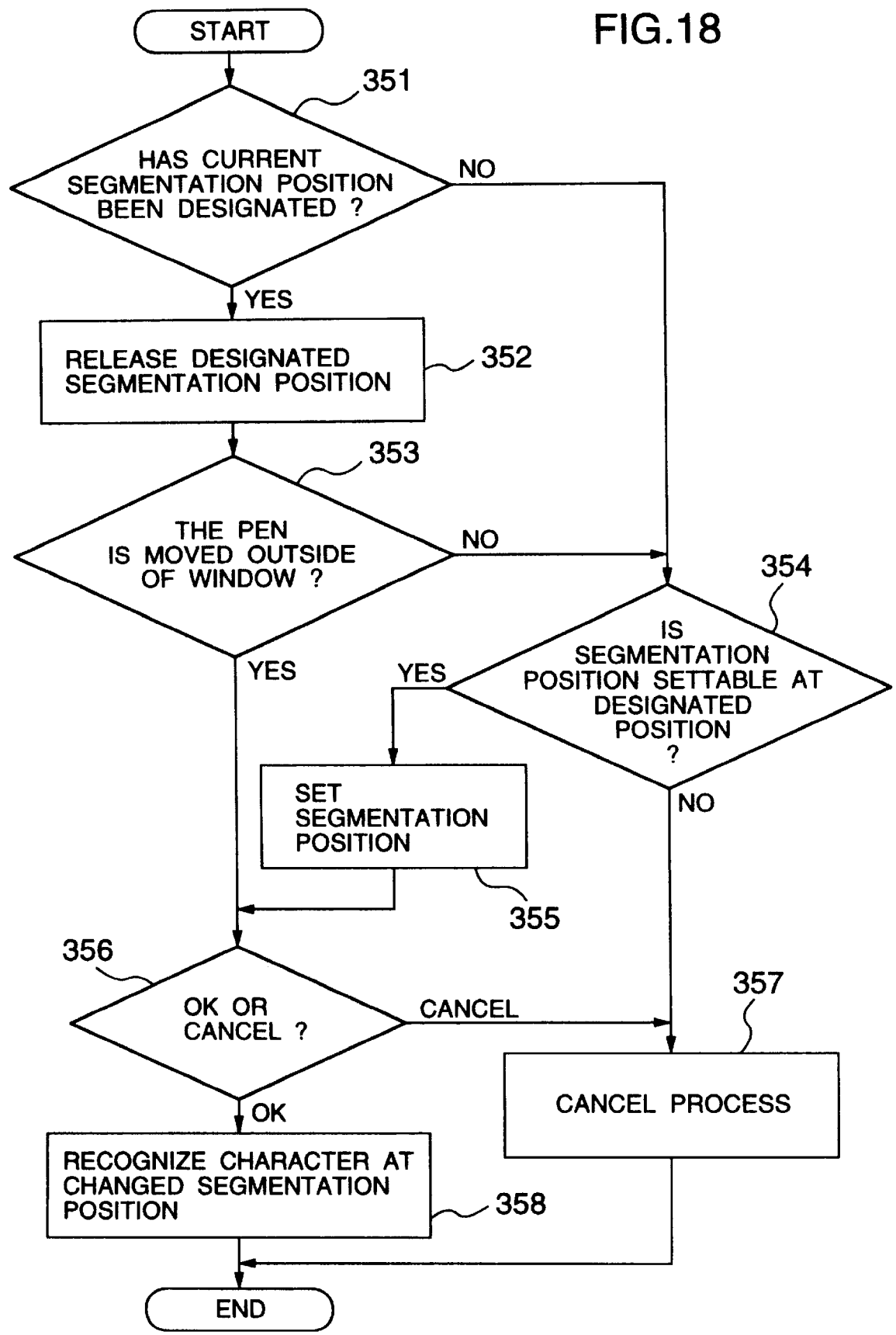
FIG. 18 is a flow chart indicating a segmentation correction process.

The segmentation correction process will be described next with reference to a flow chart of FIG. 18. The segmentation correction process is performed by the resetting unit 220.

Ink data and its segmenting position are displayed by the segmentation resetting unit 20 in the window 253 of the correction I/F display screen 252, as described above. By designating an icon 254 which indicates the segmentation position, or by inputting a gesture of drawing a vertical line at a desired position in the window 53, the segmentation correction process starts.

First, it is determined whether the current segmentation position or icon 254 has been designated (step 351). If so, the designated segmentation position is released (step 352). When the shifting or dragging of the designated icon 254 is carried out by the user using a pen 212, the position of the destination to which the icon 254 is moved is detected. If the destination is within the area of the window 253 (step 353), the movement of the segmentation position is determined as being designated and the destination is determined as being designated by the user. The process then passes to step 354. If the destination is outside the area of the window 253, it is assumed that the user intends to release the segmentation position. The process then passes to step 356 for confirmation. When a position other than the current segmentation position is designated, i,e. a gesture of drawing a vertical line is inputted in step 351, it is determined that additional setting of a segmentation position is designated at the position where the gesture is inputted.

The process then passes to step 354, where it is determined whether a segmentation position is settable at the designated position, irrespective of movement or additional setting of the segmentation position. There is a specified place in the ink data where a segmentation position can not be set in dependence on a segmentation algorithm used in the segmentation engine unit 214 or a recognition algorithm used in the character recognition unit 218. When the place where the segmentation position can not be set is designated, for example, when a segmentation line (icon) traverses the ink data at the designated position, a message indicating this situation is displayed on the input/display screen 231. The process then passes to step 357 to perform a cancel process. When a settable position is designated, the segmentation position is set at the designated position (step 355). The process then passes to step 356, where it is determined which of the buttons "OK" and "C" (cancel) 255 and 265 has been clicked. If the cancel button "C" has been clicked, the process passes to step 357. If the button "OK" has been clicked, the segmentation position data is updated according to the new segmentation position changed as mentioned above, and the character re-recognition is performed on a part of the ink data which the result of the character recognition affects (step 308) to thereby terminate the segmentation correction process. That is, the character segmentation and re-recognition are performed sequentially on the corrected (deleted or added) portion of the ink data starting with its first character. When the corrected portion of the ink data has passed, so that the result of the recognition before correction coincides with the result of the re-recognition after correction, the re-recognition process is stopped.

In step 357 a cancel process is performed, in which the segmentation position is returned to its original position before the correction (deletion, addition). After the cancel process, the segmentation correction process ends.

Figure 19A:
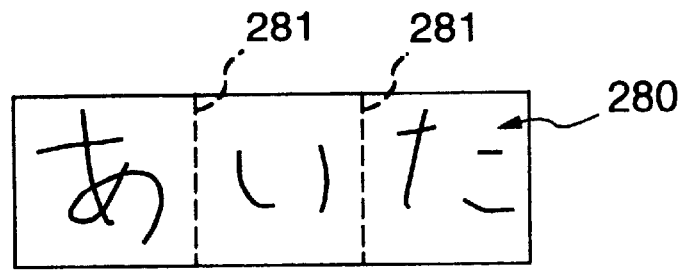
FIGS. 19A–19E are diagrams for showing a segmentation and correction process performed on ink data of a Japanese hiragana character string.
Figure 19B:
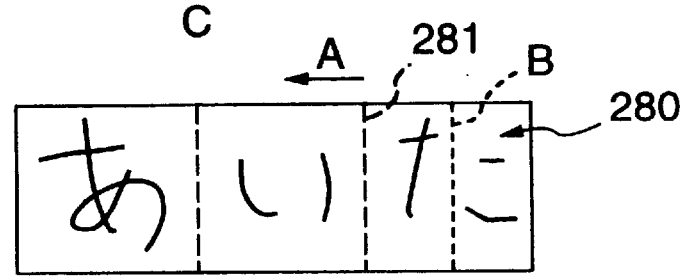
Figure 19C:
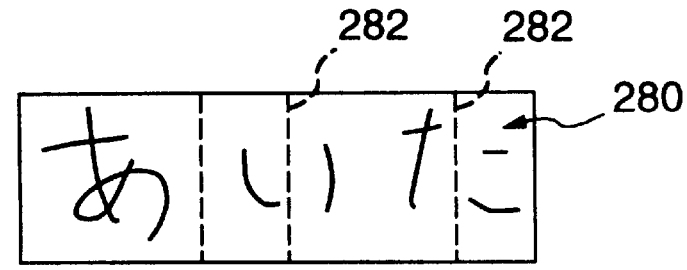

A specific example of correction of the segmentation position will be described with respect to an example of the ink data corresponding to Japanese hiragana characters. In the ink data 280 of FIG. 19A, segmentation positions are set so that " あいた " are separated by two icons 281 of thick broken lines. However, assume now that the ink data 280 should be segmented as " あいた ". In this case, the right-hand icon 281 shown at the segmentation position between " い " and " た " is moved as shown by an arrow A in FIG. 19B and a gesture 282 is inputted so as to add a thick dotted line B dividing " た " to thereby correct the segmentation positions to provide " あいた ", as shown in FIG. 19C.

Figures 19D, 19E:
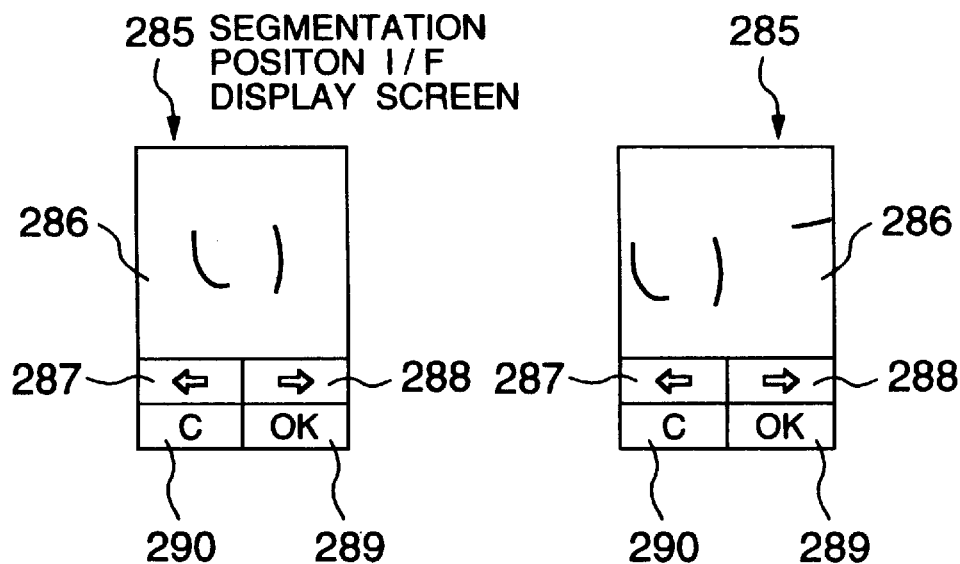

A segmentation position I/F display screen 285 as shown in FIG. 19D may be employed as an interface display screen for correction of the segmentation position. The segmentation position I/F display screen 285 includes a window 286 which displays the ink data of one character, right and left scroll buttons 288 and 287 and buttons "OK" and "C" 289, 290. The segmentation position I/F display screen 285 is opened by indicating the starting point of the segmentation position with a gesture on the ink data displayed in the window 253 of the correction I/F display screen 252. The example of FIG. 19D indicates the starting point (C) of the segmentation at a position between " あ " and " い " of the ink data shown in FIG. 19A. The ink data " い " of the first character is displayed in the window 286. By clicking the scroll button 288 with a rightward arrow thereon, the next stroke of the ink data shown in the window 286 is inputted. Since a Japanese hiragana character " た " is written starting with an upper left horizontal stroke, the display is changed to a state as shown in FIG. 19E. If the button "OK" 289 is clicked at this state, the segmentation position is changed such that ink data as shown in the window 286 of FIG. 19E appears in the segment for one character. Similarly, by clicking the scroll button 287 with a leftward arrow thereon, a part corresponding to the last stroke of the ink data displayed in the window 286 is shifted from the current displayed segment to the next segment. More specifically, by clicking the scroll button 287 with the leftward arrow thereon at the state of FIG. 19E, the display is returned to the state of FIG. 19D. By repeating the operations of such scroll buttons 287 and 288 and the button "OK" 289, the successive segmentation characters or the successive segmentation positions of the corresponding characters are set sequentially. In order to release the segmentation position, two parts of the ink data between which the segmentation position to be released are displayed simultaneously in the window 286. By clicking a point in the window 286, the ink data displayed currently therein is erased so as to allow re-input of ink data.

The processing performed by the embodiment of the handwritten character input device of the invention has been described with respect to the case in which handwritten Japanese character string mixed with Chinese characters is inputted. However, the use of the handwritten character input device of the invention is not restricted to a handwritten Japanese character recognition process, but is applicable to a different handwritten character recognition, for example, a handwritten alphabetical character recognition or an Arabian handwritten character recognition. A handwritten alphabetical character recognition performed by the handwritten character input device of this embodiment will be described below with respect to an example in which the ink data corresponding to an English word is inputted. The handwritten character input device according to the present invention includes those adapted for Japanese characters, as mentioned above, those adapted for alphabetical characters alone, and those adapted for both of alphabetical and Japanese characters. The handwritten character input device adapted for alphabetical characters alone has no function of converting Japanese kana to Chinese characters and an input/display screen for displaying alphabetical display and window which will be described below. In the handwritten character input device adapted for both of Japanese and alphabetical characters, it is desired that any one of the processing for recognition of Japanese character ink data and the processing for recognition of alphabetical ink data is selected by inputting a specified gesture.

Figure 11:
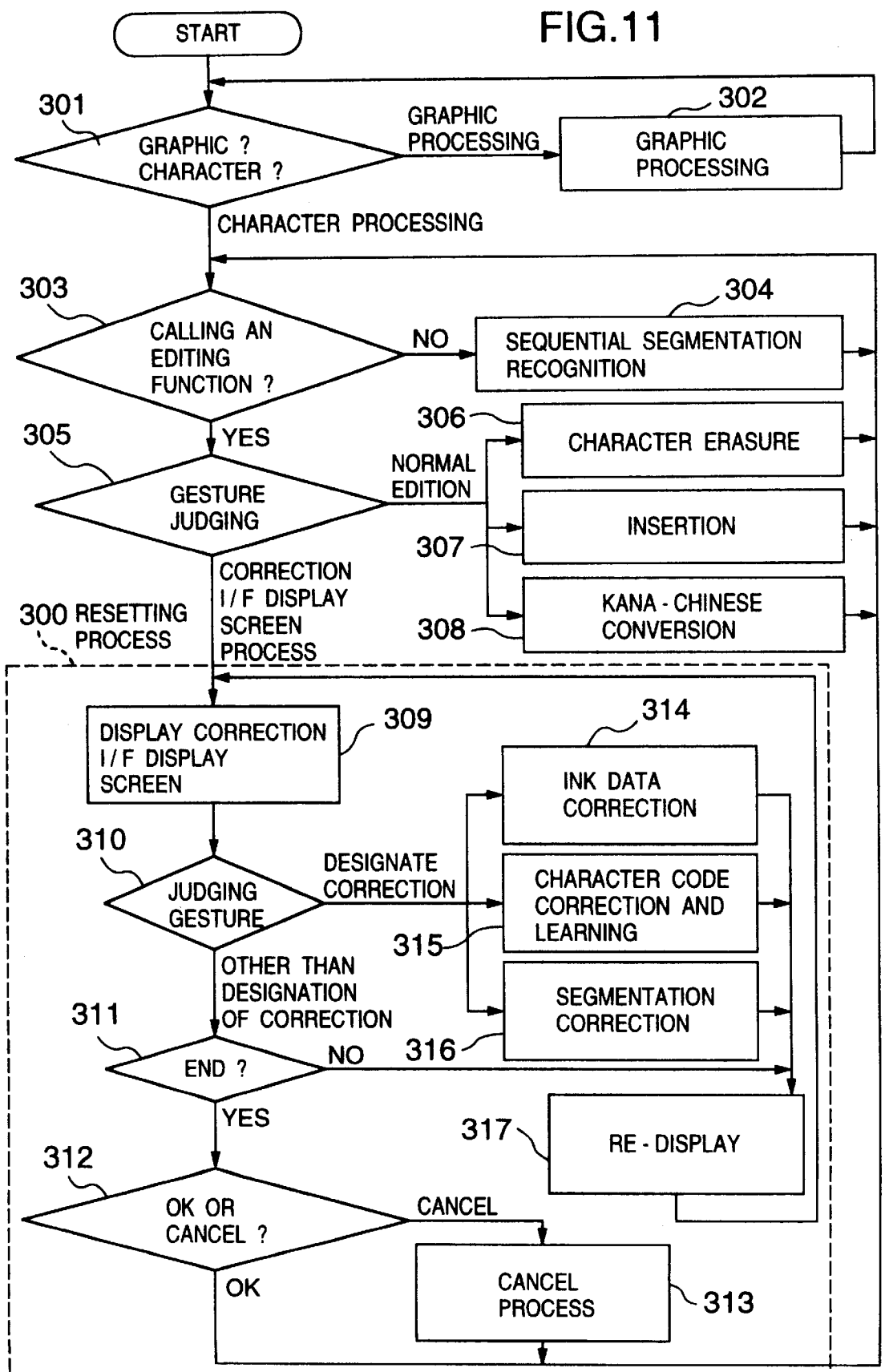
FIG. 11 is a flow chart indicating the operation of the handwritten character input device in FIG. 10.

The processing shown in a flow chart of FIG. 11 is applicable to any of the ink data of Japanese characters and that of alphabetical characters. Thus, in the present embodiment, the relationship in correspondence between the case of Japanese characters mentioned above and the present case is specified, and displays appearing on the input/display screen 231 and corresponding input gestures will be mainly described. Since no Chinese characters are handled, the Japanese kana-to-Chinese character conversion process at step 308 is not performed. The algorithm used in the segmentation engine unit 214 for determination of a segmentation position in the case of Japanese characters including Chinese ones may be different from the algorithm used for the same purpose in the case of alphabetical characters. In the alphabetical characters, the input of handwritten characters in a cursive fashion is preferably not precluded. Thus, a segmentation algorithm applicable to handwritten characters inputted in a cursive fashion is preferably employed. Whether the characters of ink data are inputted separately one by one or in a cursive fashion is discriminated in dependence on the expansion of each of the strokes composing the ink data and/or the presence/absence of a blank space area in the ink data. Therefore, it is desirable to determine whether the characters of ink data are inputted separately one by one or in a cursive fashion after the handwritten characters are inputted thereby to select the adapted processing.

Figure 20A:
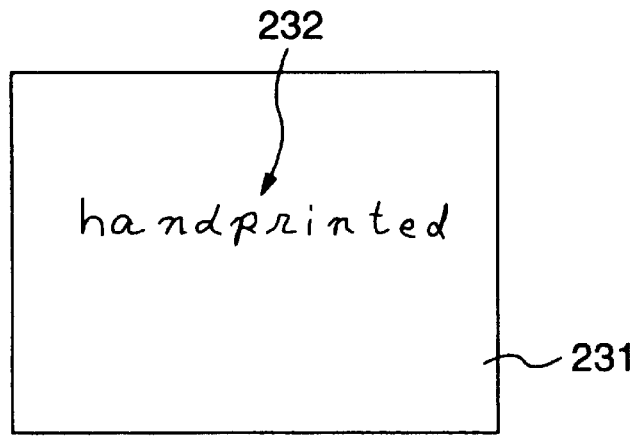
FIGS. 20A–20C are diagrams for explaining a segmentation and character recognition process performed on ink data of an English character string.
Figure 20B:
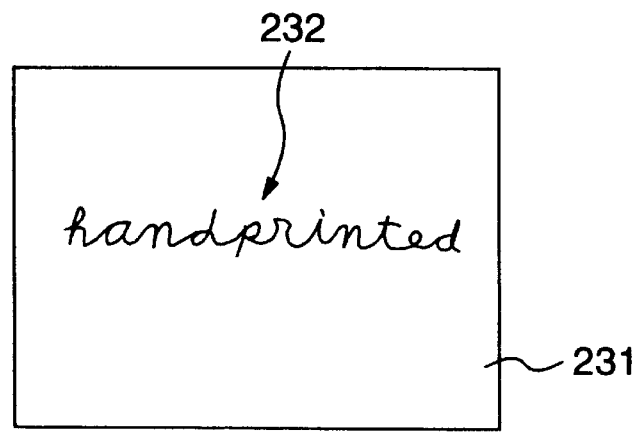
Figure 20C:
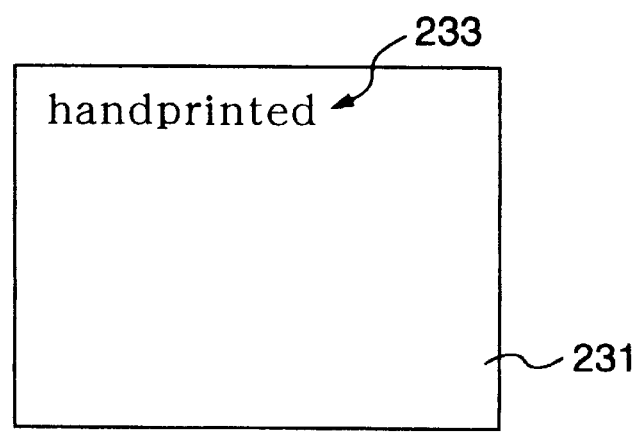

FIGS. 20A–20C are diagrams for explaining a sequential segmentation and character recognition process for ink data of an English character string in step 304. FIGS. 20A and 20B show input handwritten characters 232 to the input/display screen 231 and correspond to FIG. 12A. In the case of inputting alphabetical handwritten characters, they can be inputted separately one by one or in a cursive fashion, as mentioned above. FIG. 20A shows handwritten characters inputted one by one, while FIG. 20B shows handwritten characters inputted in a cursive fashion. In any case, ink data corresponding to "handprinted" is input. When handwritten characters 32 corresponding to an English character string are inputted, as just described, character segmentation and character recognition are sequentially performed in the same manner as in the case of the Japanese characters, as mentioned above. As a result, as shown in FIG. 20C corresponding to FIG. 12B, a recognized character string 233 is displayed on the input/display screen 231 instead of the ink data.

Figure 21A:
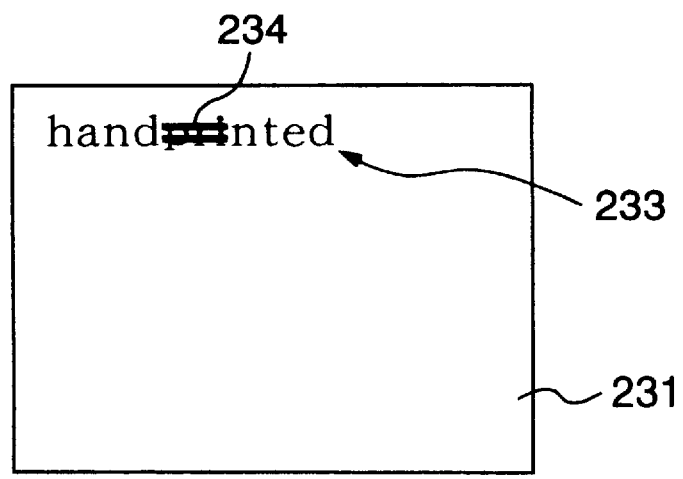
FIGS. 21A and 21B are diagrams showing erasure and insertion processes, respectively, performed on a recognized English character string.
Figure 21B:
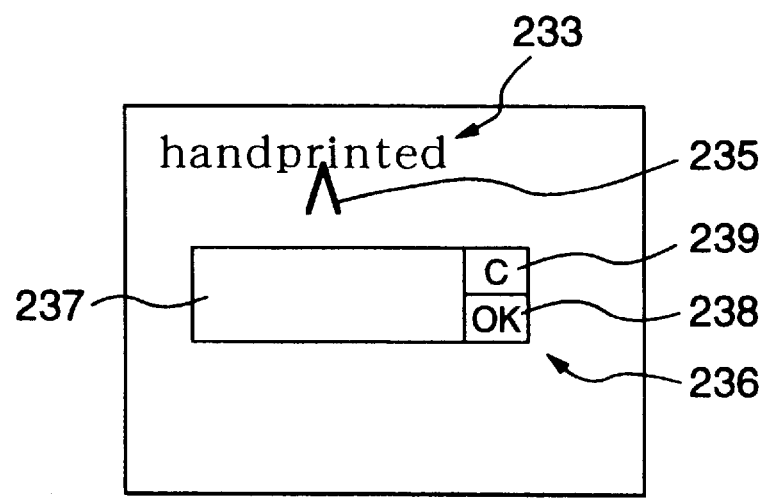

FIG. 21A is a diagram for explaining a character erasure process in step 306 and corresponds to FIG. 13A. When the recognized character string 233 is an English character string "handprinted", and if a gesture 234 of drawing two lines on a part or whole of the English character string is inputted, the characters of that designated part are erased. In the case of the example of FIG. 21A, the character string changes to "handnted". FIG. 21B is a diagram for explaining the insertion process of step 307 and corresponds to FIG. 13B. By inputting a " ʌ "-like gesture 235 at a position where a character is to be inserted in the English character string, an insertion interface window 236 is called on the input/display screen 231. By inputting a handwritten character to the interface window 236, the character of the inputted ink data is recognized and the recognized character is inserted at the position designated by the " ʌ "-like gesture 235 in the recognized character string 233. The composition of the interface window 236 is similar to that described in FIG. 13B. In the case of the Japanese character processing, a Japanese kana-Chinese character conversion window is opened by inputting a gesture of drawing an underline under a part or whole of the recognized character string 233, as shown in FIG. 13C. However, when alphabetical characters are processed, no Japanese kana-Chinese character conversion is required, so that such window is not opened.

Figure 22A:
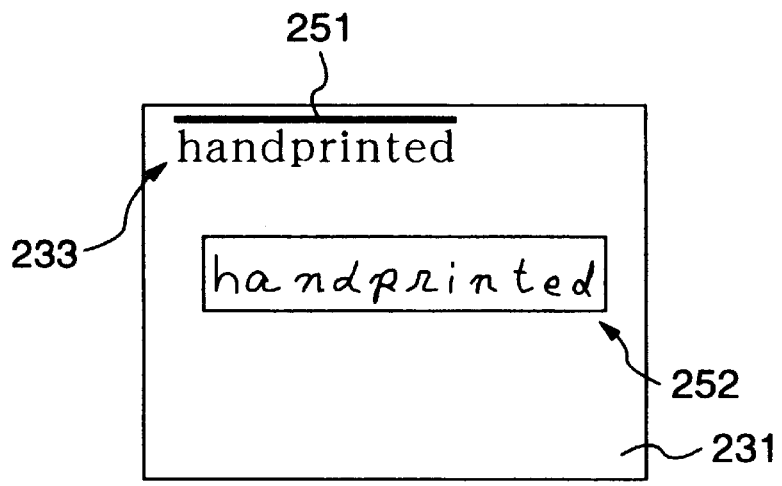
FIGS. 22A–22C are diagrams for explaining a correction I/F display screen.

The processing, which is performed when ink data corresponding to an English character string has been inputted and it is determined in step 305 that the processing is related to the correction I/F display screen, will be described next. As shown in FIG. 22A, by inputting a gesture 251, for example, of drawing a line over the recognized character string 233 as in the processing for the Japanese character string (FIG. 14A), the processing for the correction I/F display screen is determined to thereby open the correction I/F display screen 252 on the input/display screen 231. The correction I/F display screen used when the ink data of the English character string is processed is similar to that used when the ink data of the Japanese character string is processed, but the English correction I/F display screen has no function of Japanese kana-Chinese character conversion.

Figure 22B:
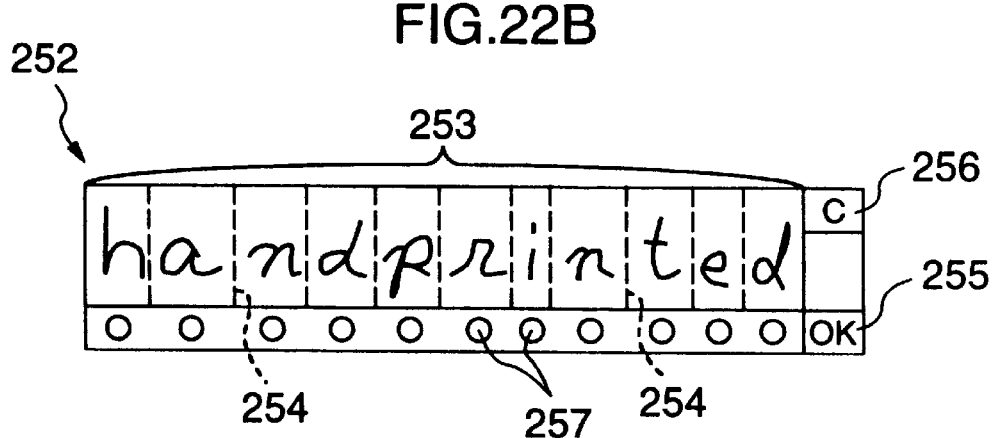
Figure 22C:
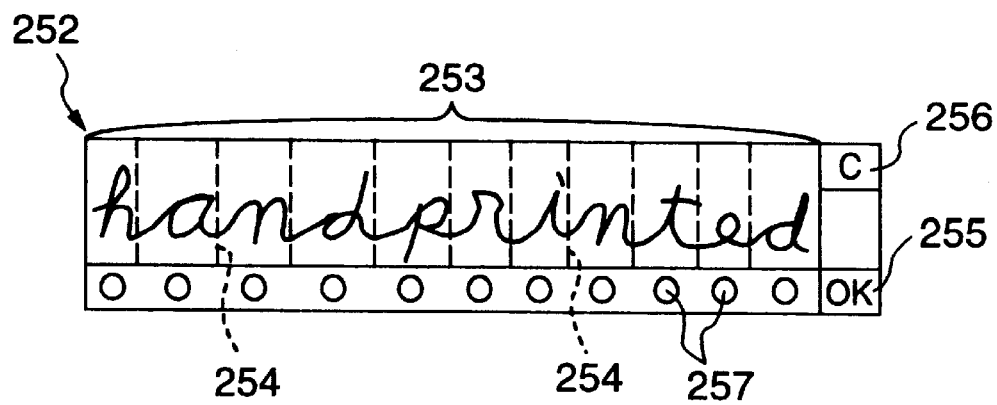

FIGS. 22B and 22C correspond to FIG. 14B and illustrate the details of the correction of I/F display screen 252. FIG. 22B shows the correction I/F display screen 252 in a state where the characters have been inputted separately one by one while FIG. 22C shows the correction I/F display screen 252 in a state where the characters have been inputted in a cursive fashion. When the characters are inputted separately one by one, a segmentation position can be detected based on a blank space between characters. Icons 254 shown by broken lines in the window 253 of FIG. 22B show segmentation positions found by the segmentation engine unit 214 in this way. When the characters are inputted in a cursive fashion, character segmentation can not be performed by detecting a blank space between characters. In this case, for example, the moving direction of a pen point when inputting handwritten characters is detected. A position in the ink data where the movement of the pen point changes from an upper left-to-lower right direction to a lower left-to-upper right direction, or from a left-to-right direction to an upper right-to-lower left direction, is determined as a character segmentation position candidate and the segmentation position is determined by further considering a margin of one-character width. FIG. 22B shows the segmentation positions determined in this way by broken line icons 254. This English correction I/F display screen 252 has buttons 255–257 similar to those of the Japanese correction I/F display screen, and is used for correction of the ink data in step 314, for correction/learning of the characters/codes in step 315 and for correction of segmentation of the ink data in step 316 as in the processing of the Japanese ink data.

Figure 17B:
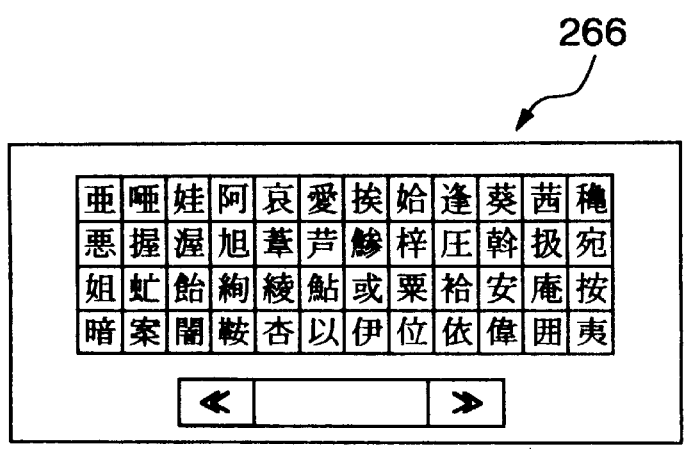
Figure 17C:
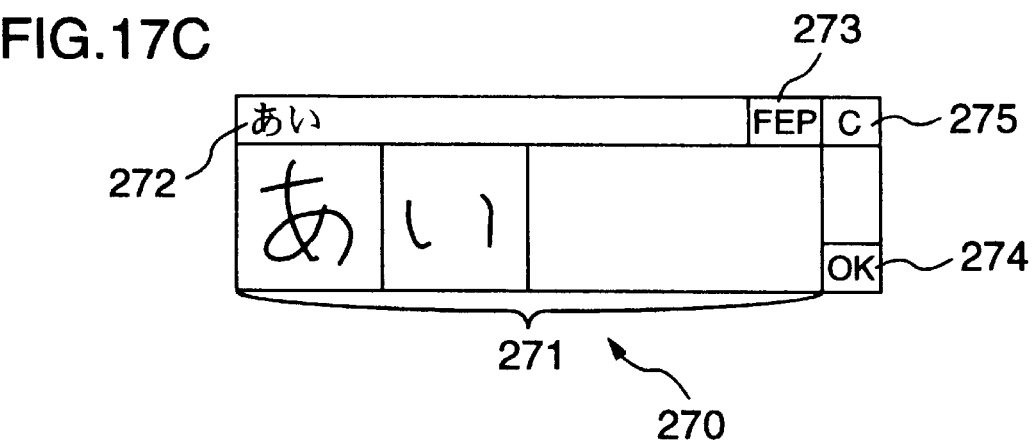
Figure 17D:
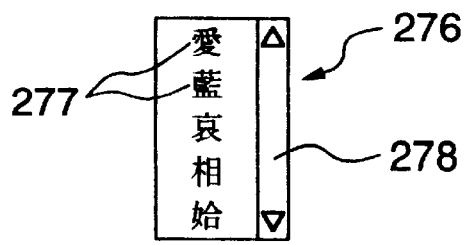
Figure 23A:
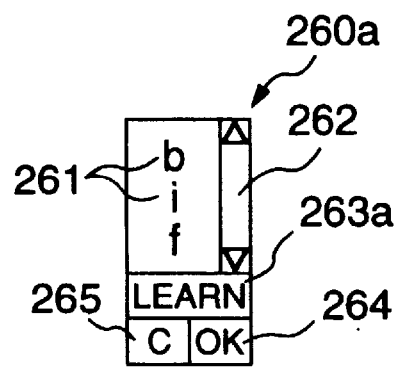
FIGS. 23A and 23B are diagrams for explaining a correction and learning process performed on character codes indicating alphabetical characters.
Figure 23B:
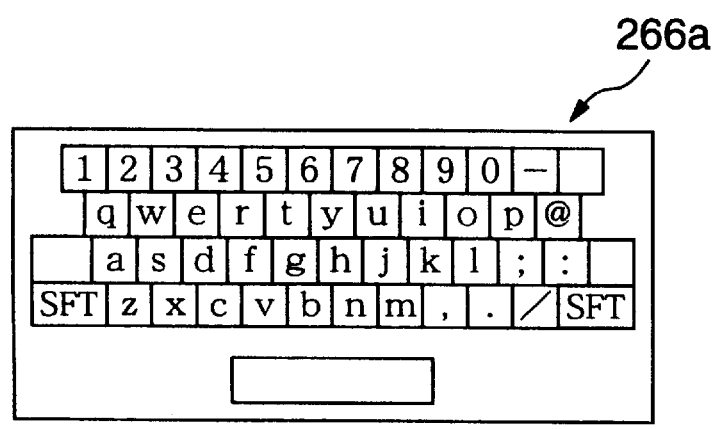

FIGS. 23A, 23B correspond to FIGS. 17A, 17B, respectively, and are diagrams for explaining correction/learning of character codes for an English character string. When the character code correction button 257 is clicked in the correction I/F display screen of FIGS. 22B, 22C, an alphabetical character candidate selection I/F display screen 260a of FIG. 23A is displayed. The candidate selection I/F display screen 260a is similar to the Japanese character candidate selection I/F display screen 260 of FIG. 17A, but has a button "LEARN" 263a instead of the button "あ" 263. These two buttons 263 and 263a are equivalent in function. An alphabetical virtual keyboard 266a of FIG. 23B may be used instead of the candidate selection I/F display screen 260a. Since the total number of different alphabetical characters is smaller than that of different Japanese characters, the character code correction/learning process can be performed only with the candidate selection I/F display screen 260a and the virtual keyboard 266a, and a handwritten character input virtual keyboard used for processing the Japanese characters is not required to be provided.

Figure 24A:
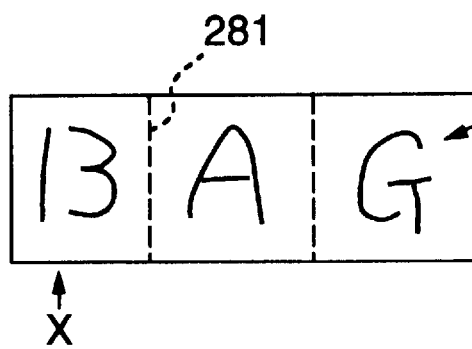
FIGS. 24A–24D are diagrams showing segmentation and correction processes performed on ink data of handwritten alphabetical characters inputted separately from one another.
Figure 24C:
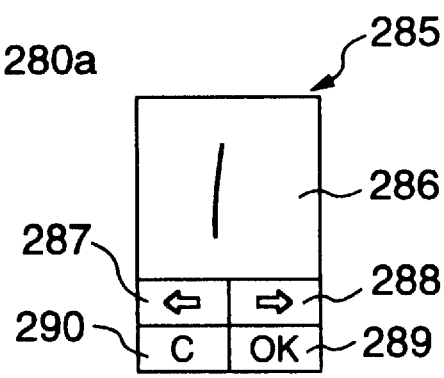
Figure 24B:
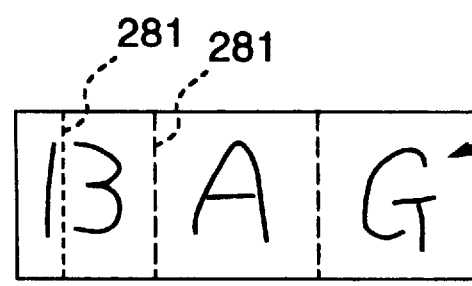
Figure 24D:
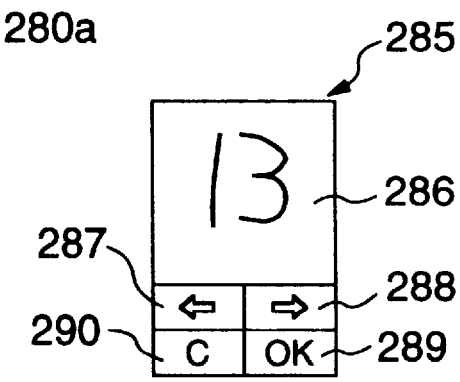

A specific example of correction of the segmentation position will be described next. FIGS. 24A, 24B, 24C and 24D correspond to FIGS. 19A, 19C, 19D and 19E, respectively, and are diagrams for explaining a segmentation correction process for ink data of alphabetical characters inputted separately one by one. In the ink data 280a of FIG. 24A, segmentation positions are set so as to read "BAG" with thick broken-line icons 281. If the ink data 280a should be segmented so as to read "13AG", a gesture is inputted to divide "B" at a position X so that the segmentation position is corrected to read "13AG", as shown in FIG. 24B. As in the Japanese language, the segmentation position I/F display screen 285 may be used. FIGS. 24C and 24D show the segmentation position I/F display screen 285 in a state that the leading end of the ink data 280a is designated as the starting point in segmentation of the ink data. By operating the scroll buttons 287 or 288, the next stroke of the displayed character in the ink data is called and displayed, or its last stroke is cancelled from the screen.

Figure 25A:
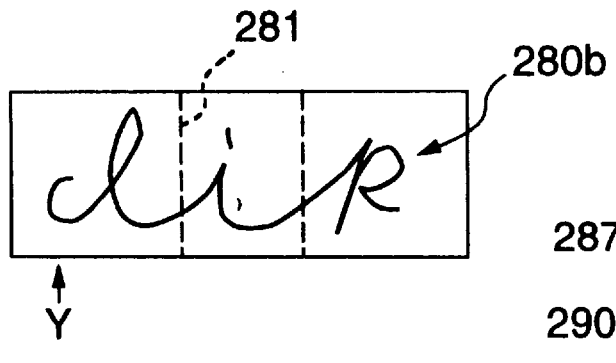
FIGS. 25A–25D are diagrams showing segmentation and correction processes performed on ink data of handwritten alphabetical characters inputted in a cursive fashion.
Figure 25C:
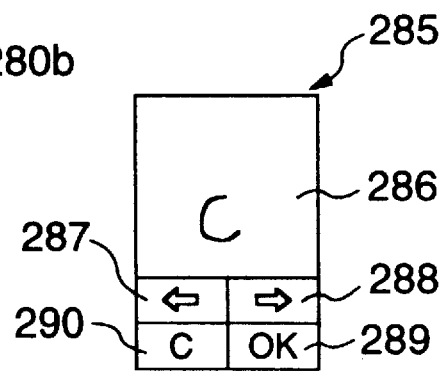
Figure 25B:
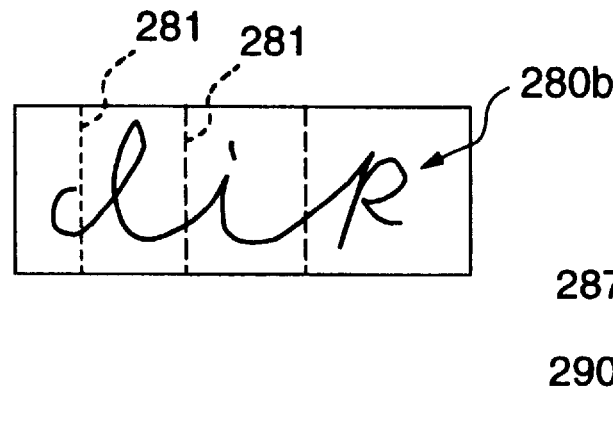
Figure 25D:
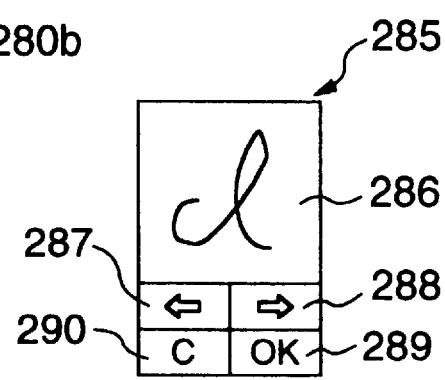

FIGS. 25A, 25B, 25C and 25D are diagrams for explaining correction of the segmentation of the ink data of handwritten alphabetical characters inputted in a cursive fashion, and correspond to FIGS. 19A, 19C, 19D and 19E, respectively. In the ink data 280b of FIG. 25A, segmentation positions are set so as to read "dip". If this ink data 280b should truly be segmented so as to read "clip", a dividing gesture is inputted at a position Y as shown. As a result, the segmentation position is corrected so as to read "clip", as shown in FIG. 25B. Like the case where the characters are inputted separately one by one, the segmentation position I/F display screen 285 may be used. FIGS. 25C and 25D show a segmentation position I/F display screen 285 in a state that the leading end of the ink data 280b is designated as the starting point in segmentation of the ink data. Since characters of this ink data are inputted in a cursive fashion in this case, a part of the ink data displayed on the segmentation position I/F display screen 285 changes by unit corresponding to each segmentation position candidate found in the ink data each time when the scroll button 287 or 288 is clicked.

As described above, the handwritten character input device of the invention displays the ink data as inputted by the user, along with its segmentation positions, which are resettable in accordance with the user's instructions on the display. Thus, it is possible to confirm whether the segmentation is performed at the user's intended position. When the ink data is segmented wrongly, a correct segmentation position can be designated. Thus, the characters are not required to be inputted again to thereby greatly improve operability.

By using an integral type display means, which is also capable of inputting ink data thereto, a segmentation position is directly designated on the displayed ink data. Thus, operability is further improved. When a character recognition mechanism is incorporated and character recognition is performed again in dependence on the result of resetting the segmentation position, the result of resetting the segmentation position is directly reflected on the result of the recognition.

What is claimed is:

1. A method of recognizing handwritten characters, comprising the steps of: preparing a recognition dictionary including a plurality of characters and corresponding character clusters, and a weighing dictionary including weighing clusters and corresponding object characters;

setting all segmentation position candidates by segmenting handwritten character ink data, each of the position candidates being separated in a direction corresponding to a direction in which the handwritten character ink data is inputted from a leading position of the ink data and satisfying a predetermined condition;

selecting a character candidate corresponding to each segment of the ink data segmented at the segmentation position candidates by referring to the recognition dictionary and calculating a distance value between each of the segments of the ink data and a selected one of the character clusters;

searching the weighing dictionary and applying a weighing quantity to the distance value calculated for one of the character clusters corresponding to the selected character candidate, if a distance between one of the weighing clusters included in the weighing dictionary and any one of the segments of the ink data segmented at the segmentation position candidates is equal to or less than a predetermined threshold value and if the object character of said one weighing cluster coincides with the selected character candidate; and determining a rank of the character candidates in accordance with the weighted distance values thereof.

2. A method according to claim 1, wherein the weighting of the distance value of the one character candidate is based on a second distance value between the object character of the weighting cluster, which coincides with the one character candidates, and the segment of the ink data corresponding to said one character candidate.

3. A method according to claim 2, wherein the weighting of the distance value becomes larger, as the second value becomes smaller.

4. A method according to claim 1, further comprising the step of designating one of the character candidates based on the result of determining the rank of the character candidates.

5. A method according to claim 4, further comprising the steps of checking, when one of the character candidates other than the character candidate having a first rank is designated, whether there exists a cluster of one of the character candidates which is different from the designated one character candidate and has a distance value smaller than the distance value of the designated one character candidate, and if exists, newly registering in the weighting dictionary the segment of the ink data segmented at one of the position candidates being the most remote from the leading position of the ink data as the weighting cluster together with the character candidate having a higher rank than the designated character candidate as the object character.

6. A method according to claim 5, further comprising the step of erasing an old weighting cluster, which has been previously registered in the weighting dictionary.

7. A handwritten character recognition device comprising:

input means for inputting by a user characters in a handwriting manner;

storage means for storing ink data of the inputted handwritten characters;

a recognition dictionary in which a plurality of characters and corresponding character clusters are registered;

a weighing dictionary in which weighing clusters and corresponding object characters are registered;

means for determining all segmentation position candidates, which satisfy a predetermined condition, for segmentation of the ink data stored in the storage means along a direction corresponding to a direction in which the ink data is inputted from a leading position of the ink data;

means for obtaining character candidates corresponding to segments of the ink data segmented at the segmentation position candidates, respectively, based upon a distance value between each of the segments of the ink data and the character cluster of a corresponding one of the character candidates by referring to the recognition dictionary;

means for applying a weighing quantity to the distance value between any one of the segments of the ink data and the character cluster of the corresponding one of the character candidates, if a distance between one of the weighing clusters included in the weighing dictionary and said one of the segments of the ink data is equal to or less than a predetermined threshold value and if the object character of said one weighing cluster coincides with said corresponding one of the character candidates; and means for ranking the character candidates based on the distance values, or the weighted distance values, if any, thereof.

8. A handwritten character recognition apparatus according to claim 7, further comprising means for checking, when one of the character candidates ranked with a first order is different from one of the character candidates which is intended by the user, whether there exists a cluster of one of the character candidates which is different from the character candidate intended by the user and has a distance value smaller than the distance value of the user's intended character candidate, and if exists, newly registering in the weighting dictionary the segment of the ink data segmented at one of the position candidates being the most remote from the leading position of the ink data as the weighting cluster together with the character candidate ranked higher than the user's intended character candidate as the object character.

9. A handwritten character recognition apparatus according to claim 8, further comprising means for erasing an old weighting cluster, which has been previously registered in the weighting dictionary.

10. A method of recognizing handwritten characters, comprising the steps of:

preparing a recognition dictionary in which a plurality of characters and character feature vectors corresponding to said plurality of characters, respectively, are registered and a weighing dictionary in which a plurality of weighing clusters and object characters corresponding to said weighing clusters, respectively, are registered;

inputting handwritten character ink data via input means into processing means;

separating said inputted handwritten character ink data at segmentation position candidates to obtain a plurality of ink data segments, said separation being started with a leading position of said inputted handwritten character ink data;

calculating a feature vector for each of the ink data segments;

determining a distance value between the feature vector obtained for each of said ink data segments and a selected one of the character feature vectors registered in said recognition dictionary, said distance being limited to a predetermined range;

selecting a character candidate corresponding to each of said ink data segments based on said distance value;

searching the weighing dictionary and applying a weighing quantity to said distance value determined for one of the character feature vectors corresponding to said selected character candidate, (a) if a distance between at least one of the weighing clusters registered in said weighing dictionary and the feature vector of one of said ink data segments is equal to or less than a predetermined threshold value, and (b) if the object character corresponding to said at least one weighing cluster coincides with said selected character candidate; and determining a rank of the character candidates in accordance with the weighted distance value thereof, whereby said ink data segment is recognized based on said rank.

* * * * *